(12) United States Patent
Chiueh et al.

(10) Patent No.: US 8,718,061 B2
(45) Date of Patent: May 6, 2014

(54) DATA CENTER NETWORK SYSTEM AND PACKET FORWARDING METHOD THEREOF

(75) Inventors: Tzi-Cker Chiueh, Taipei (TW); Ming-Chao Hsu, Hsinchu (TW); Cheng-Chun Tu, Stony Brook, NY (US)

(73) Assignee: Industrial Technology Research Institute, Hsinchu (TW)

( * ) Notice: Subject to any disclaimer, the term of this patent is extended or adjusted under 35 U.S.C. 154(b) by 264 days.

(21) Appl. No.: 12/949,801

(22) Filed: Nov. 19, 2010

(65) Prior Publication Data

US 2012/0131225 A1 May 24, 2012

(51) Int. Cl.
*H04L 12/28* (2006.01)
*H04L 12/54* (2013.01)
*G06F 15/173* (2006.01)

(52) U.S. Cl.
USPC ........... 370/392; 370/394; 370/397; 370/409; 370/428; 370/465; 370/474; 709/203; 709/230; 709/238; 718/1

(58) Field of Classification Search
USPC .............. 709/203, 230, 238; 711/209, 2, 207, 711/128; 714/21, 724; 726/1; 370/392, 394, 370/397, 409, 428, 465, 474; 455/446, 455/432.1; 718/1
See application file for complete search history.

(56) References Cited

U.S. PATENT DOCUMENTS

| | | | |
|---|---|---|---|
| 6,438,720 B1 * | 8/2002 | Boutaud et al. | 714/724 |
| 6,614,437 B1 * | 9/2003 | Kou et al. | 345/520 |
| 7,130,307 B2 | 10/2006 | Nakamura et al. | |
| 7,643,424 B2 | 1/2010 | Liu et al. | |
| 7,715,379 B2 | 5/2010 | Gonda | |
| 7,751,399 B2 | 7/2010 | Martini et al. | |

(Continued)

FOREIGN PATENT DOCUMENTS

TW   I322606   3/2010

OTHER PUBLICATIONS

Jose Morales Barroso, "Ethernet Fabric Routing (UETS/EFR)—A Hierarchical, Scalable and Secure Ultrahigh Speed Switching Architecture", Conference paper, INFOCOM 2006. 25th IEEE International Conference on Computer Communications, Joint Conference of the IEEE Computer and Communications Societies, Apr. 23-29, 2006, Barcelona, Catalunya, Spain 2006.

(Continued)

*Primary Examiner* — Alpus H Hsu
*Assistant Examiner* — Walter Divito
(74) *Attorney, Agent, or Firm* — Jianq Chyun IP Office

(57) ABSTRACT

A data center network system and a packet forwarding method are provided. The data center network includes a management server and a plurality of machines containing physical machines and virtual machines. The management server configures a logical media access control (MAC) address for each of the machines, wherein most significant bytes of each of the logical MAC addresses are set as 0. When a data packet is about to be sent from a physical machine, the physical machine executes an encapsulation procedure on the data packet for forwarding the data packet to an intermediate node between a transmitter and a receiver of the data packet, and the intermediate node executes a decapsulation procedure on the data packet for forwarding the data packet to the true receiver. Accordingly, the number of virtual machines exposed to the forwarding table of Ethernet switches can be effectively reduced.

52 Claims, 13 Drawing Sheets

(56) References Cited

U.S. PATENT DOCUMENTS

| | | |
|---|---|---|
| 7,801,125 B2 | 9/2010 | Kreeger et al. |
| 2003/0048771 A1* | 3/2003 | Shipman ............... 370/351 |
| 2004/0137904 A1* | 7/2004 | Gradischnig ............ 455/446 |
| 2007/0192354 A1* | 8/2007 | Wei et al. ............... 707/102 |
| 2008/0101386 A1 | 5/2008 | Gray |
| 2008/0200168 A1 | 8/2008 | Jiang |
| 2008/0205266 A1* | 8/2008 | Hahm ................... 370/229 |
| 2009/0303880 A1* | 12/2009 | Maltz et al. ............ 370/235 |
| 2009/0316628 A1* | 12/2009 | Enns et al. ............. 370/328 |
| 2009/0316704 A1 | 12/2009 | Sodder et al. |
| 2010/0067385 A1 | 3/2010 | Liu et al. |
| 2010/0290391 A1* | 11/2010 | Cheng et al. ........... 370/328 |
| 2012/0208533 A1* | 8/2012 | Muhanna et al. ........ 455/432.1 |

OTHER PUBLICATIONS

Daisuke Ishii, "Experiments of GMPLS based layer2 path control functions for next generation wide area layer2 networks" iPOP2009, Tokyo, Japan. 2006.

IEEE Standard for Local and metropolitan area networks—Virtual Bridged Local Area Networks Amendment 10: Provider Backbone Bridge Traffic Engineering, Aug. 2009, IEEE Computer Society, p. 1-p. 145.

* cited by examiner

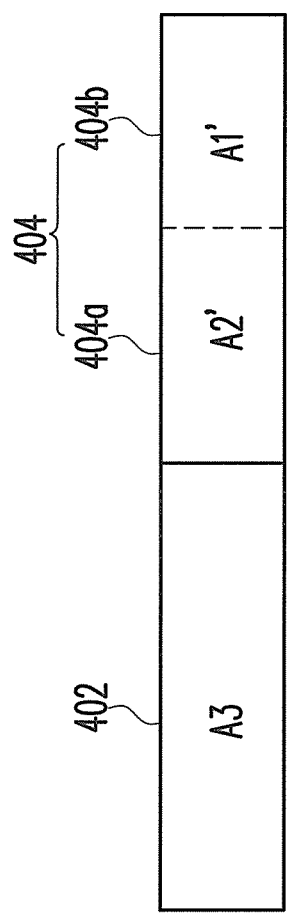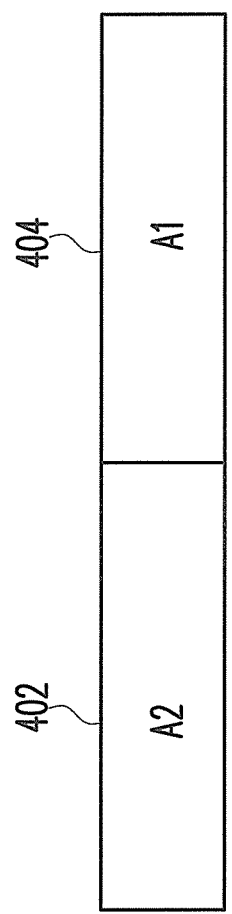
FIG. 4
FIG. 5

| Sequence | Source | Destination |
|---|---|---|
| 1 | 712a | 1002 |
| 2 | 712 | 714 |
| 3 | 712 | 1002 |
| 4 | 712a | 912a |
| 5 | 712a | 714a |
| ⋮ | ⋮ | ⋮ |

FIG. 11

DATA CENTER NETWORK SYSTEM AND PACKET FORWARDING METHOD THEREOF

BACKGROUND

1. Field of the Disclosure

The disclosure relates to a data center network system and a packet forwarding method.

2. Description of Related Art

Along with development of network technology, corporations widely use networks to provide services or exchange information. However, the cost for constructing and maintaining network equipments is considerable. Therefore, an operation mode of a network data center is gradually developed. The so-called network data center is referred to a large-scale data storage center, which can provide services such as host collocation, host rent, remote backup, and system and network management, etc. For example, after a corporation rent a host space or purchase a host collocation service from a network data center provider, the corporation can arbitrarily access and manage all information in their remote host space. Therefore, it is unnecessary for the corporation to construct a machine room for containing hardware or telecommunication equipments, instead, the corporation can place the related machines in the machine room owned by the network data center provider or rent the machines owned by the network center provider. In this way, the cost for network connection is reduced, and the labor cost for daily maintenance of the equipments is saved.

A most important part in operation of the network data center is to construct a structure of a data center network, so as to construct a large amount of virtual hosts to execute various services. Especially, in the data center network, the virtual hosts have to be easily migrated, and data packets have to be efficiently transmitted without causing a transmission loop. Therefore, it is an important issue for the related practitioner to design an efficient, liable and manageable network based on an economically reasonable design.

Ethernet is a trend of the current network structure, which has been widely applied in local area networks.

FIG. 1 is a diagram illustrating a network topology of an Ethernet structure used for a container computer of a network data center.

Referring to FIG. 1, the network can be divided into a core layer, a region layer and a top-of-rack (ToR) layer. The core layer includes 12 Ethernet switches, the region layer includes 12 Ethernet switches, and the ToR layer includes 48 Ethernet switches.

One container computer has 12 racks, and each rack has 4 ToR network switches. Moreover, each container includes 40 servers (i.e. physical machines), so that each of the container computers includes 480 servers. Assuming each of the servers operates 20 virtual machines, one container computer can provide 9600 virtual machines.

Although the Ethernet technology can be conveniently applied to the data center network, is has a problem of scalability. In detail, when a transmitter (for example, a virtual machine or a physical machine) on the Ethernet is about to send a data packet to a receiver (for example, a virtual machine or a physical machine) for communication, all of the network switches on a transmission path of the data packet between the transmitter and the receiver have to be stored with address information of the receiver, and such information occupies a forwarding table entry in a forwarding table. However, the forwarding table configured in a commodity Ethernet switch can only record 16K-32K forwarding table entries, so that the Ethernet can only contain several hundreds to several thousands of the physical machines, generally.

FIG. 2 is an example of transmitting a data packet on the Ethernet.

Referring to FIG. 2, in the Ethernet, a physical machine A, a physical machine B and a physical machine C are connected through network switches SW1, SW2, SW3 and SW4 and communicate with each other by using network protocols on top of Ethernet. If virtual machines B1, B2 and B3 are run on the physical machine B, and the physical machine A forwards data packets to the virtual machines B1, B2 and B3 through a forwarding path $P_1$ formed by the network switch SW1, the network switch SW2, the network switch SW3 and the physical machine B, forwarding tables of the network switch SW1, the network switch SW2 and the network switch SW3 have to be stored with address information of the virtual machines B1, B2 and B3, so that the data packets can be successfully forwarded to the virtual machines B1, B2 and B3 from the physical machine A. Therefore, in FIG. 2, if the forwarding table of the network switch SW1 can only store 16K forwarding table entries, the physical machine A can only communicate with 16K machines at most.

Accordingly, when constructing a mega data center, which hosts millions of virtual machines, about 110 container computers are required based on our design. Now, the Ethernet will not support communication of such large amount of the physical machines or the virtual machines.

SUMMARY OF THE DISCLOSURE

The disclosure is directed to a data center network system and a packet forwarding method, by which the number of machines can be effectively expanded under the Ethernet protocol.

The disclosure provides a data center network system comprising a first physical machine, a first virtual machine run on the first physical machine, a second physical machine, a second virtual machine run on the second physical machine, a network switch and a management server. The first virtual machine is configured for sending a data packet to the second virtual machine, and the network switch is configured for forwarding the data packet. The first physical machine, the second physical machine, the network switch and the management server communicate with each other based on the Ethernet protocol. The management server configures a corresponding logical media access control address for each of the first physical machine, the first virtual machine, the network switch, the second physical machine and the second virtual machine, wherein each of the logical media access control addresses comprises the most significant bytes and the least significant bytes, and each of the most significant bytes is set as 0. The first physical machine has an encapsulation module, and the encapsulation module is configured for encapsulating the data packet from the first virtual machine, wherein the logical media access control address of the network switch is put in a destination address field of the encapsulated data packet, and the least significant bytes of the logical media access control address of the first virtual machine and the least significant bytes of the logical media access control address of the second virtual machine are put in a source address field of the encapsulated data packet. Moreover, the first physical machine is configured for sending the encapsulated data packet.

The disclosure provides a data center network system comprising a first physical machine, a first virtual machine run on the first physical machine, a second physical machine, a second virtual machine run on the second physical machine, and a management server. The first virtual machine is configured for sending a data packet to the second virtual machine. The first physical machine, the second physical machine and the management server communicate with each other based on the Ethernet protocol. The management server configures a corresponding logical media access control address for each of the first physical machine, the first virtual machine, the second physical machine and the second virtual machine, wherein each of the logical media access control addresses comprises the most significant bytes and the least significant bytes, and each of the most significant bytes is set as 0. The first physical machine has an encapsulation module, and the encapsulation module is configured for encapsulating the data packet from the first virtual machine, wherein the logical media access control address of the second physical machine is put in a destination address field of the encapsulated data packet, and the least significant bytes of the logical media access control address of the first virtual machine and the least significant bytes of the logical media access control address of the second virtual machine are put in a source address field of the encapsulated data packet. Moreover, the first physical machine is configured for sending the encapsulated data packet.

The disclosure provides a data center network system comprising a plurality of machines, a plurality of network switches and a management server. The machines comprise a plurality of physical machines and a plurality of virtual machines, wherein each of the virtual machines is belonged to one of the physical machines, and the physical machines are connected through the network switches. The management server configures corresponding logical media access control addresses for the machines and the network switches, wherein each of the logical media access control addresses comprises the most significant bytes and the least significant bytes, and each of the most significant bytes is set as 0. The machines, the network switches and the management server communicate with each other based on the Ethernet protocol. The management server establishes a plurality of source-destination pairs according to the machines, estimates a priority sequence of the source-destination pairs, and assigns a transmission mode corresponding to each of the source-destination pairs to be a direct route mode or an indirect route mode according to the priority sequence and a plurality of forwarding table entries of each of the network switches. Especially, when the indirect route mode is used to send a data packet from a first virtual machine to a second virtual machine, a first physical machine corresponding to the first virtual machine identifies a network switch corresponding to the second virtual machine, encapsulates the data packet according to the identified network switch, and sends the encapsulated data packet, wherein the logical media access control address of the network switch corresponding to the second virtual machine is put in a destination address field of the encapsulated data packet, and the least significant bytes of the logical media access control address of the first virtual machine and the least significant bytes of the logical media access control address of the second virtual machine are put in a source address field of the encapsulated data packet.

The disclosure provides a data center network system comprising a plurality of machines, a plurality of network switches and a management server. The machines comprise a plurality of physical machines and a plurality of virtual machines, wherein each of the virtual machines is belonged to one of the physical machines, and the physical machines are connected through the network switches. The management server configures corresponding logical media access control addresses for the machines and the network switches, wherein each of the logical media access control addresses comprises the most significant bytes and the least significant bytes, and each of the most significant bytes is set as 0. The machines, the network switches and the management server communicate with each other based on the Ethernet protocol. The management server establishes a plurality of source-destination pairs according to the machines, estimates a priority sequence of the source-destination pairs, and assigns a transmission mode corresponding to each of the source-destination pairs to be a direct route mode or an indirect route mode according to the priority sequence and a plurality of forwarding table entries of each of the network switches. Especially, when the indirect route mode is used to send a data packet from a first virtual machine to a second virtual machine, a first physical machine corresponding to the first virtual machine identifies a second physical machine corresponding to the second virtual machine, encapsulates the data packet according to the identified second physical machine, and sends the encapsulated data packet, wherein the logical media access control address of the second physical machine corresponding to the second virtual machine is put in a destination address field of the encapsulated data packet, and the least significant bytes of the logical media access control address of the first virtual machine and the least significant bytes of the logical media access control address of the second virtual machine are put in a source address field of the encapsulated data packet.

The disclosure provides a packet forwarding method, which is adapted to forward a data packet from a first virtual machine run on a first physical machine to a second virtual machine run on a second physical machine according to the Ethernet protocol, wherein the second physical machine is connected to a network switch. The package forwarding method can be described as follows. A corresponding logical media access control address is configured for each of the first physical machine, the first virtual machine, the network switch, the second physical machine and the second virtual machine, wherein each of the logical media access control addresses comprises the most significant bytes and the least significant bytes, and each of the most significant bytes is set as 0. The data packet is encapsulated, wherein in the encapsulated data packet, the logical media access control address of the network switch is put in a destination address field of the encapsulated data packet, and the least significant bytes of the logical media access control address of the first virtual machine and the least significant bytes of the logical media access control address of the second virtual machine are put in a source address field of the encapsulated data packet. The encapsulated data packet is sent by the first physical machine.

The disclosure provides a packet forwarding method, which is adapted to forward a data packet from a first virtual machine run on a first physical machine to a second virtual machine run on a second physical machine according to an Ethernet protocol. The package forwarding method can be described as follows. A corresponding logical media access control address is configured for each of the first physical machine, the first virtual machine, the second physical machine and the second virtual machine, wherein each of the logical media access control addresses comprises the most significant bytes and the least significant bytes, and each the most significant bytes is set as 0. The data packet is encapsulated, wherein in the encapsulated data packet, the logical media access control address of the second physical machine is put in a destination address field of the encapsulated data packet, and the least significant bytes of the logical media access control address of the first virtual machine and the least significant bytes of the logical media access control address of the second virtual machine are put in a source address field of the encapsulated data packet. The encapsulated data packet is sent by the first physical machine.

The disclosure provides a packet forwarding method, which is adapted to forward data packets among a plurality of machines according to the Ethernet protocol, wherein the machines comprise a plurality of physical machines and a plurality of virtual machines, each of the virtual machines is belonged to one of the physical machines, and the physical machines are connected through a plurality of network switches. The package forwarding method can be described as follows. Corresponding logical media access control addresses are respectively configured for the physical machines, the virtual machines and the network switches, wherein each of the logical media access control addresses comprises the most significant bytes and the least significant bytes, and each of the most significant bytes is set as 0. A plurality of source-destination pairs is established according to the machines. A priority sequence of the source-destination pairs is estimated. A transmission mode corresponding to each of the source-destination pairs is assigned to be a direct route mode or an indirect route mode according to the priority sequence and a plurality of forwarding table entries of each of the network switches. When the indirect route mode is used to send a data packet from a first virtual machine to a second virtual machine, a network switch corresponding to the second virtual machine is identified, the data packet is encapsulated, and the encapsulated data packet is sent, wherein the logical media access control address of the network switch corresponding to the second virtual machine is put in a destination address field of the encapsulated data packet, and the least significant bytes of the logical media access control address of the first virtual machine and the least significant bytes of the logical media access control address of the second virtual machine are put in a source address field of the encapsulated data packet.

The disclosure provides a packet forwarding method, which is adapted to forward data packets among a plurality of machines according to an Ethernet protocol, wherein the machines comprise a plurality of physical machines and a plurality of virtual machines, each of the virtual machines is belonged to one of the physical machines, and the physical machines are connected through a plurality of network switches. The package forwarding method can be described as follows. Corresponding logical media access control addresses are respectively configured for the physical machines, the virtual machines and the network switches, wherein each of the logical media access control addresses comprises the most significant bytes and the least significant bytes, and each of the most significant bytes is set as 0. A plurality of source-destination pairs is established according to the machines. A priority sequence of the source-destination pairs is estimated. A transmission mode corresponding to each of the source-destination pairs is assigned to be a direct route mode or an indirect route mode according to the priority sequence and a plurality of forwarding table entries of each of the network switches. When the indirect route mode is used to send a data packet from a first virtual machine to a second virtual machine, a second physical machine corresponding to the second virtual machine is identified, the data packet is encapsulated, and the encapsulated data packet is sent, wherein the logical media access control address of the second physical machine corresponding to the second virtual machine is put in a destination address field of the encapsulated data packet, and the least significant bytes of the logical media access control address of the first virtual machine and the least significant bytes of the logical media access control address of the second virtual machine are put in a source address field of the encapsulated data packet.

According to the above descriptions, utilization of the forwarding table entries can be greatly reduced, so as to effectively increase the number of virtual machines configured in the data center network system.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 is a schematic diagram illustrating encapsulation of a data packet according to the first exemplary embodiment of the disclosure.

FIG. 5 is a schematic diagram of decapsulation of a data packet according to the first exemplary embodiment of the disclosure.

FIG. 11 is a schematic diagram illustrating a priority sequence of source-destination pairs according to the fourth exemplary embodiment of the disclosure.

DETAILED DESCRIPTION OF DISCLOSED EMBODIMENTS

In order to expand virtual machines or physical machines connected in an Ethernet, in the disclosure, an indirect route mode is used to transmit data packets. In this way, utilization of forwarding table entries of each network switch can be greatly reduced. Therefore, a data center network system using general Ethernet switches can support a large amount of virtual machines. Several exemplary embodiments are provided below to describe the disclosure in detail.

First Exemplary Embodiment

Figure 1:
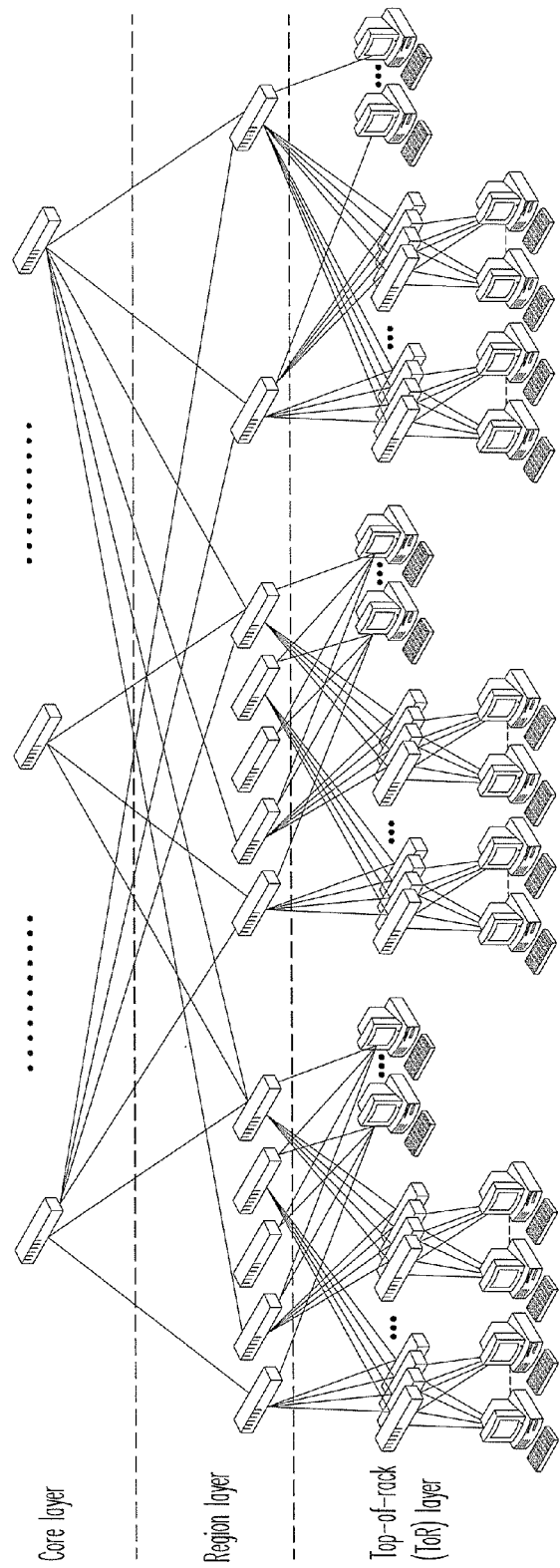
FIG. 1 is a diagram illustrating a network topology of an Ethernet structure used for a container computer of a network data center.
Figure 2:
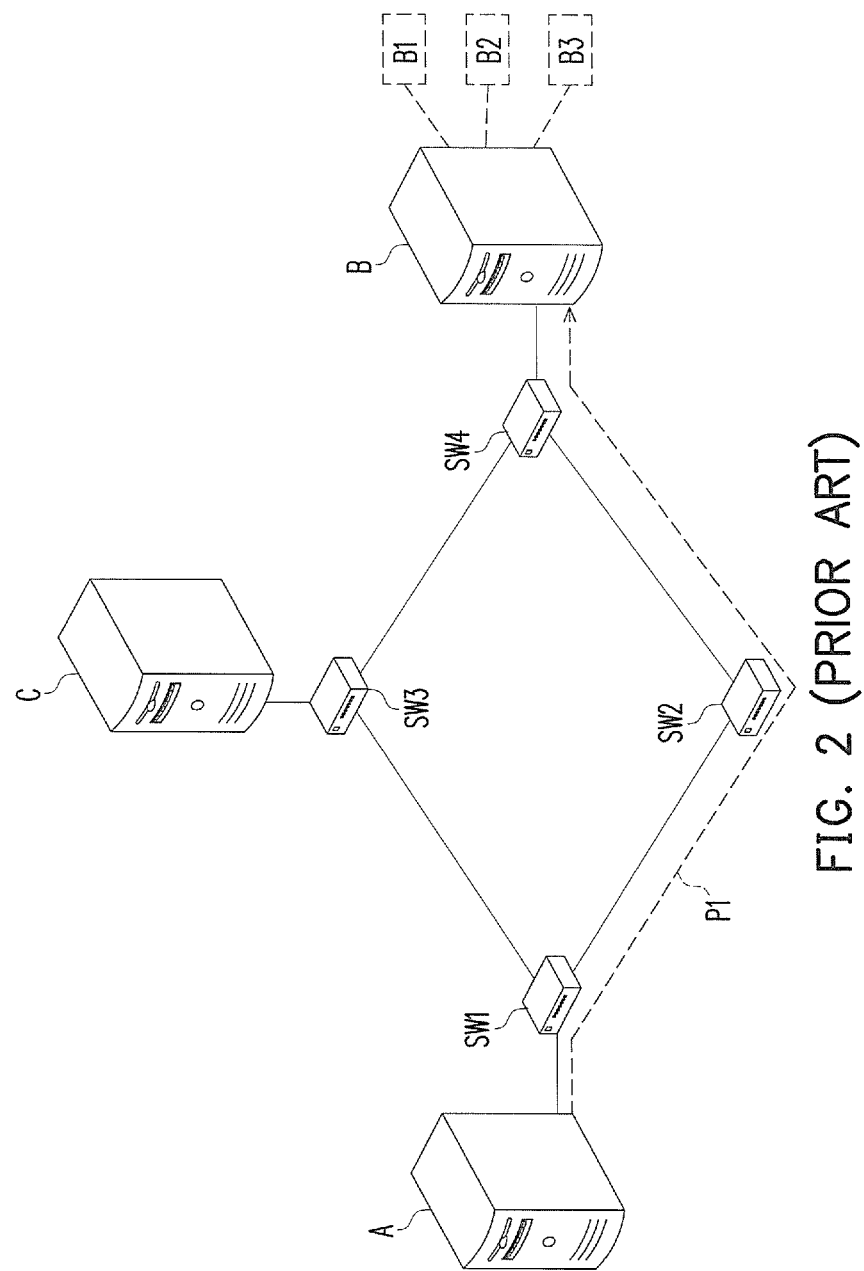
FIG. 2 is an example of transmitting a data packet on an Ethernet.
Figure 3:
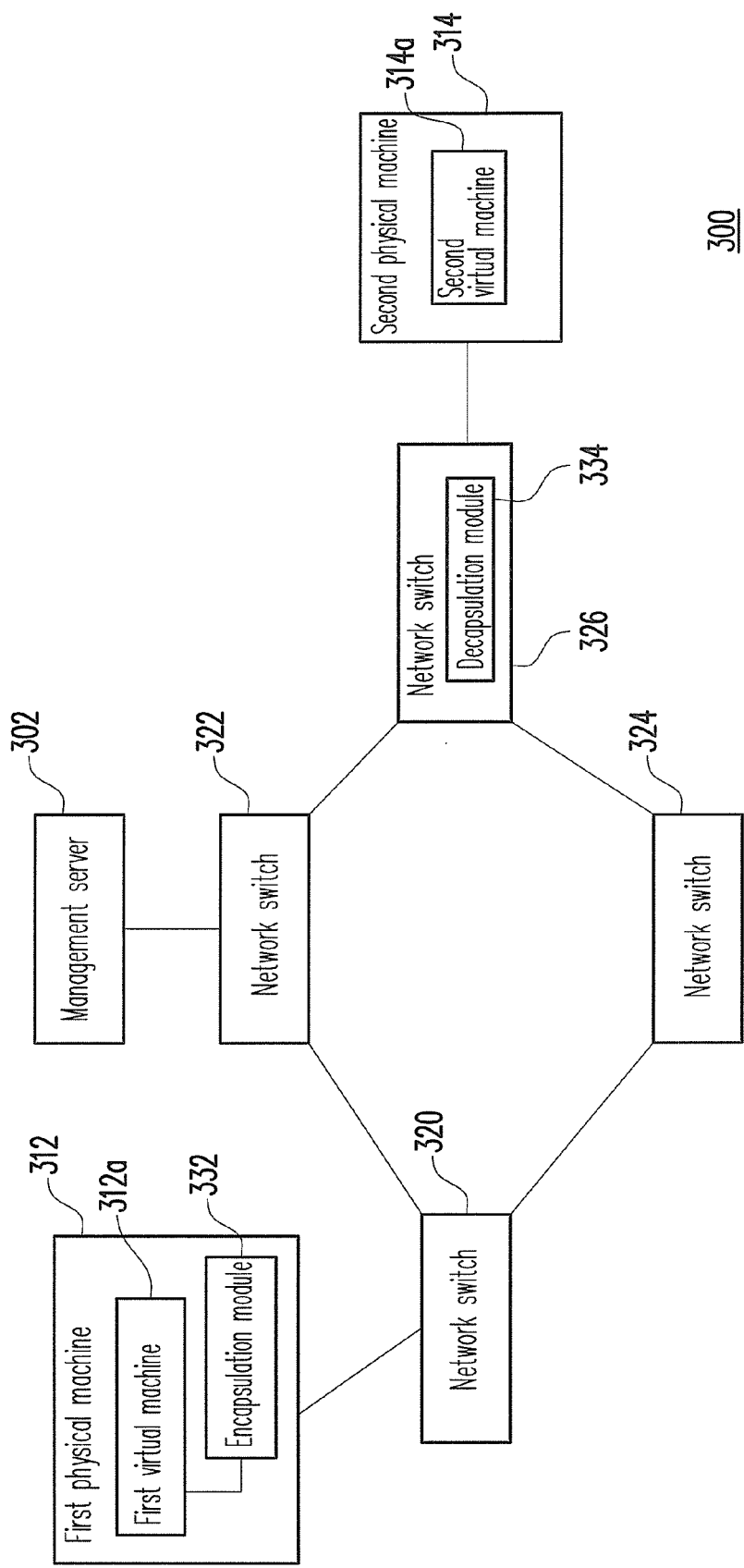
FIG. 3 is a schematic diagram illustrating a data center network system according to a first exemplary embodiment of the disclosure.

FIG. 3 is a schematic diagram illustrating a data center network system according to a first exemplary embodiment of the disclosure.

Referring to FIG. 3, the data center network system 300 includes a management server 302, a first physical machine 312, a first virtual machine 312a, a second physical machine 314, a second virtual machine 314a, a network switch 320, a network switch 322, a network switch 324 and a network switch 326.

The management server 302 is configured for managing all of the connected physical machines, the virtual machines and the network switches in the data center network system 300. For example, the management server 302 is a directory server, and stores related management information, where the management information includes related information of the virtual machines operated in the physical machines and information of top-of-rack (ToR) network switches connected to the physical machines. In the present exemplary embodiment, the management server 302 configures a corresponding logical media access control (MAC) address for each of the physical machines, the virtual machines, and the network switches in the data center network system 300.

In detail, the MAC is a lower part of a data link layer in a local area network (LAN), which is used for specifying how to perform communication on a multi-point network or access communication media between different devices or nodes on the network without conflicting. Each network device (for example, a network card) is configured with a unique MAC address, i.e. a physical address when being manufactured. The MAC address has a format of 6 bytes (i.e., XX:XX:XX:XX:XX:XX). The MAC address is unique, and the MAC address of each network card is different, so that data packets can be transmitted to a specific destination device in a sub network such as the Ethernet, etc. without routers.

In the present exemplary embodiment, the management server 302 configures a unique logical MAC address for each of the physical machines, the virtual machines, and the network switches in the data center network system 300. Namely, each of the physical machines, the virtual machines and the network switches in the data center network system 300 is identified on the Ethernet through its unique logical MAC address.

In the present exemplary embodiment, the management server 302 divides the configured logical MAC addresses into the most significant bytes and the least significant bytes, wherein the most significant bytes are set as 0, and the least significant bytes are used to assign the unique addresses of the machines in the data center network system 300. For example, in the present exemplary embodiment, the most significant bytes are front 3 bytes of the logical MAC address, and the least significant bytes are posterior 3 bytes of the logical MAC address. Namely, a length of the most significant bytes is the same to that of the least significant bytes.

It should be noticed that in the disclosure, the most significant bytes are not limited to be the front 3 bytes of the logical MAC address, and in another exemplary embodiment of the disclosure, the most significant bytes can also be front 4 bytes or 5 bytes of the logical MAC address. However, the fewer the number of the bytes of the least significant bytes is, the smaller scale the data center network system 300 is (i.e. the fewer number the physical machines or the virtual machines operated within the data center network system 300 is).

The first physical machine 312 and the second physical machine 314 are physical hosts (for example, servers). Especially, the first physical machine 312 and the second physical machine 314 can respectively run one or a plurality of virtual machines to provide different services. For example, the first virtual machine 312a is run on the first physical machine 312, and the second virtual machine 314a is run on the second physical machine 314.

The network switch 320, the network switch 322, the network switch 324 and the network switch 326 are configured between the management server 302, the first physical machine 312 and the second physical machine 314, and are used for forwarding data packets. The network switch 320 may be a ToR network switch directly connected to the first physical machine 312, which is used for forwarding data packets from the first physical machine 312. Alternatively, in another exemplary embodiment, other network switches may be configured between the network switch 320 and the first physical machine 312 for forwarding the data packets from the first physical machine 312. Moreover, the network switch 326 is a ToR network switch directly connected to the second physical machine 314, though the disclosure is not limited thereto.

Especially, in the present exemplary embodiment, the first physical machine 312 has an encapsulation module 332, which is configured for executing an encapsulation procedure on a data packet to be sent by the first physical machine 312. Moreover, the network switch 326 has a decapsulation module 334, which is used for executing a decapsulation procedure on the encapsulated data packet.

In detail, when an address resolution protocol (ARP) request is sent to identify a destination address of a data packet to be transmitted from the first virtual machine 312a (i.e. a transmitter) to the second virtual machine 314a (i.e. a receiver), the first physical machine 312 redirects the ARP request to the management server 302. Moreover, the management server 302 identifies that the ToR network switch connected to the second virtual machine 314a is the network switch 326 according to the stored management information, and transmits the logical MAC address of the network switch 326 to the first physical machine 312. After the first physical machine 312 receives the logical MAC address transmitted by the management server 302, the encapsulation module 332 encapsulates the data packet to be transmitted to the second virtual machine 314a by the first virtual machine 312a according to the received logical MAC address.

For example, an Ethernet header of the data packet to be transmitted to the second virtual machine 314a by the first virtual machine 312a includes a destination address field and a source address field, wherein the encapsulation module 332 puts the received logical MAC address (i.e. the logical MAC address of the network switch 326) in the destination address field of the data packet to be transmitted, and puts the logical MAC address of the first virtual machine 312a and the logical MAC address of the second virtual machine 314a in the source address field of the data packet to be transmitted.

FIG. 4 is a schematic diagram illustrating encapsulation of a data packet to be transmitted to the second virtual machine 314a by the first virtual machine 312a according to the first exemplary embodiment of the disclosure.

Referring to FIG. 4, the encapsulation module 332 puts a logical MAC address A3 of the network switch 326 in a destination address field 402 of the data packet to be transmitted. Moreover, the encapsulation module 332 divides a source address field 404 of the data packet to be transmitted into a first part 404a and a second part 404b having the same size, and puts the least significant bytes A1' of the logical MAC address A1 of the first virtual machine 312a in the second part 404b, and puts the least significant bytes A2' of the logical MAC address A2 of the second virtual machine 314a in the first part 404a. In detail, since the most significant bytes of the logical MAC addresses used in the data center network system 300 are all 0, the least significant bytes of the logical MAC address can be used to identify each of the machines and each of the network switches. In this way, the encapsulated data packet can be transmitted to the network switch 326.

Thereafter, when the network switch 326 receives the data packet encapsulated by the encapsulation module 332 of the first physical machine 312 through the other network switches (for example, the network switch 320 and the network switch 324), the network switch 326 determines whether the front 3 bytes of the source address field (i.e. the first part of the source address field) of the received data packet are 0, and when the front 3 bytes of the source address field of the received data packet are not 0, the decapsulation module 334 of the network switch 326 decapsulates the received data packet.

In detail, in the decapsulation procedure, the decapsulation module 334 restores a part of the logical MAC address (i.e. the least significant bytes of the logical MAC address of the true receiver) originally stored in the first part of the source address field of the data packet into a complete logical MAC address and puts it in the destination address field of the data packet. Moreover, the decapsulation module 334 restores a part of the logical MAC address (i.e. the least significant bytes of the logical MAC address of the true transmitter) originally stored in the second part of the source address field of the data packet into a complete logical MAC address and puts it in the source address field of the data packet. It should be noticed that in the present exemplary embodiment, since the most significant bytes of the logical MAC addresses are set as 0, the decapsulation module 334 can restore a part of the logical MAC addresses in the first part and the second part of the source address field into the complete logical MAC addresses.

FIG. 5 is a schematic diagram of decapsulation of a data packet according to the first exemplary embodiment of the disclosure.

Referring to FIG. 5, when the network switch 326 receives the data packet and the Ethernet header of this data packet is as that shown in FIG. 4, since a value in the first part of the source address field of the data packet is not 0, the decapsulation module 334 identifies such data packet as the encapsulated data packet and executes the decapsulation procedure on it. In the decapsulation procedure, the decapsulation module 334 restores the least significant bytes A2' of the logical MAC address A2 of the second virtual machine 314a stored in the first part of the source address field of the data packet into the logical MAC address A2, and puts the logical MAC address A2 in the destination address field of the data packet to replace the logical MAC address (i.e. the logical MAC address A3 of the network switch 326) originally recorded in the destination address field. Moreover, the decapsulation module 334 restores the least significant bytes A1' of the logical MAC address A1 of the first virtual machine 312a stored in the second part of the source address field of the data packet into the logical MAC address A1, and puts the logical MAC address A1 in the source address field of the data packet.

Then, the network switch 326 forwards the data packet according to the logical MAC address in the destination address field thereof.

According to the above descriptions, in the present exemplary embodiment, when a data packet is sent by a physical machine, the physical machine first obtains an intermediate node (for example, the aforementioned network switch 326) between the transmitter and the receiver from the management server 302 to serve as a destination node of the data packet. Then, the intermediate node restores a true destination node of the data packet for forwarding the data packet. In this way, forwarding tables of the network switches on a path for forwarding the data packet are only required to record the address information of the intermediate node, so that forwarding table entries required to be stored by the network switches in the data center network system 300 are greatly reduced, and the number of the virtual machines used in the data center network system 300 can be greatly expanded under the current Ethernet.

It should be noticed that in another exemplary embodiment, besides that the network switch 326 has the decapsulation module 334 capable of executing the decapsulation procedure on the data packet, the network switch 320, the network switch 322 and the network switch 324 may also respectively have a corresponding decapsulation module capable of identifying the received data packet and executing the aforementioned decapsulation procedure. Moreover, the second physical machine 314 may also has a corresponding encapsulation module, which is used for encapsulating data packets to be transmitted. In the disclosure, the encapsulation module and the decapsulation module can be implemented by software programs or hardware circuits.

Figure 6A:
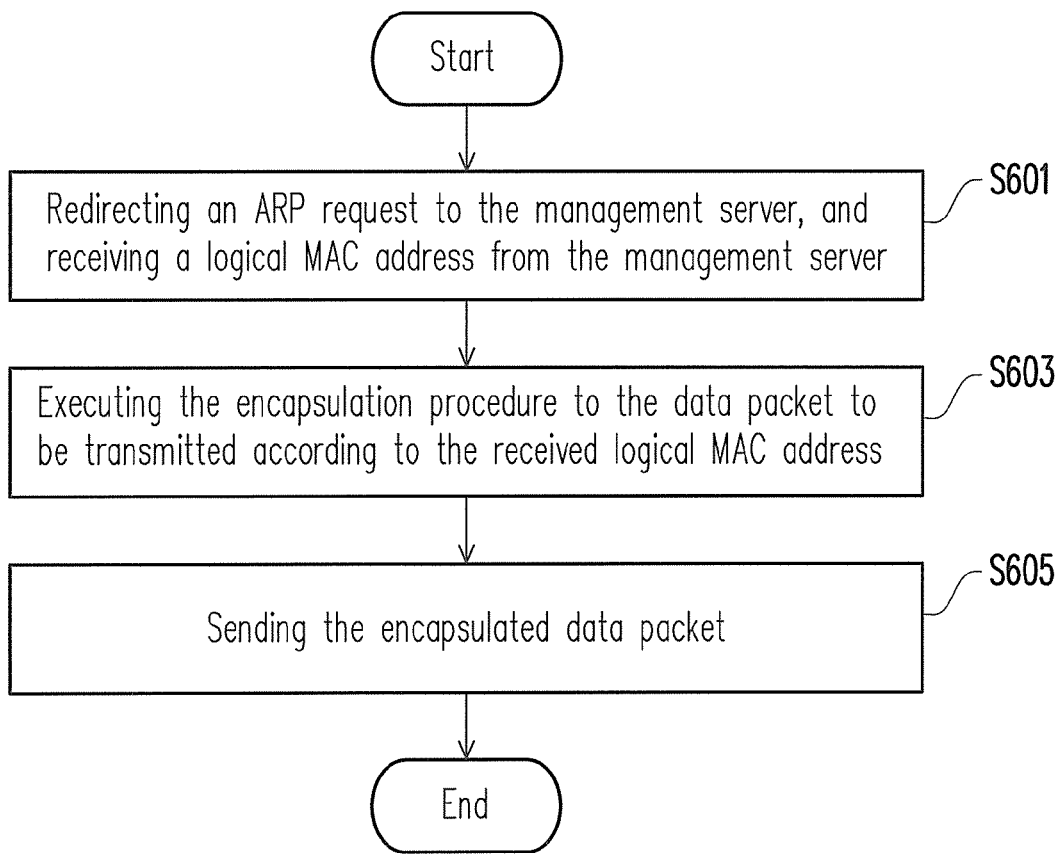
FIGS. 6A and 6B are flowcharts illustrating a packet forwarding method according to the first exemplary embodiment of the disclosure.
Figure 6B:
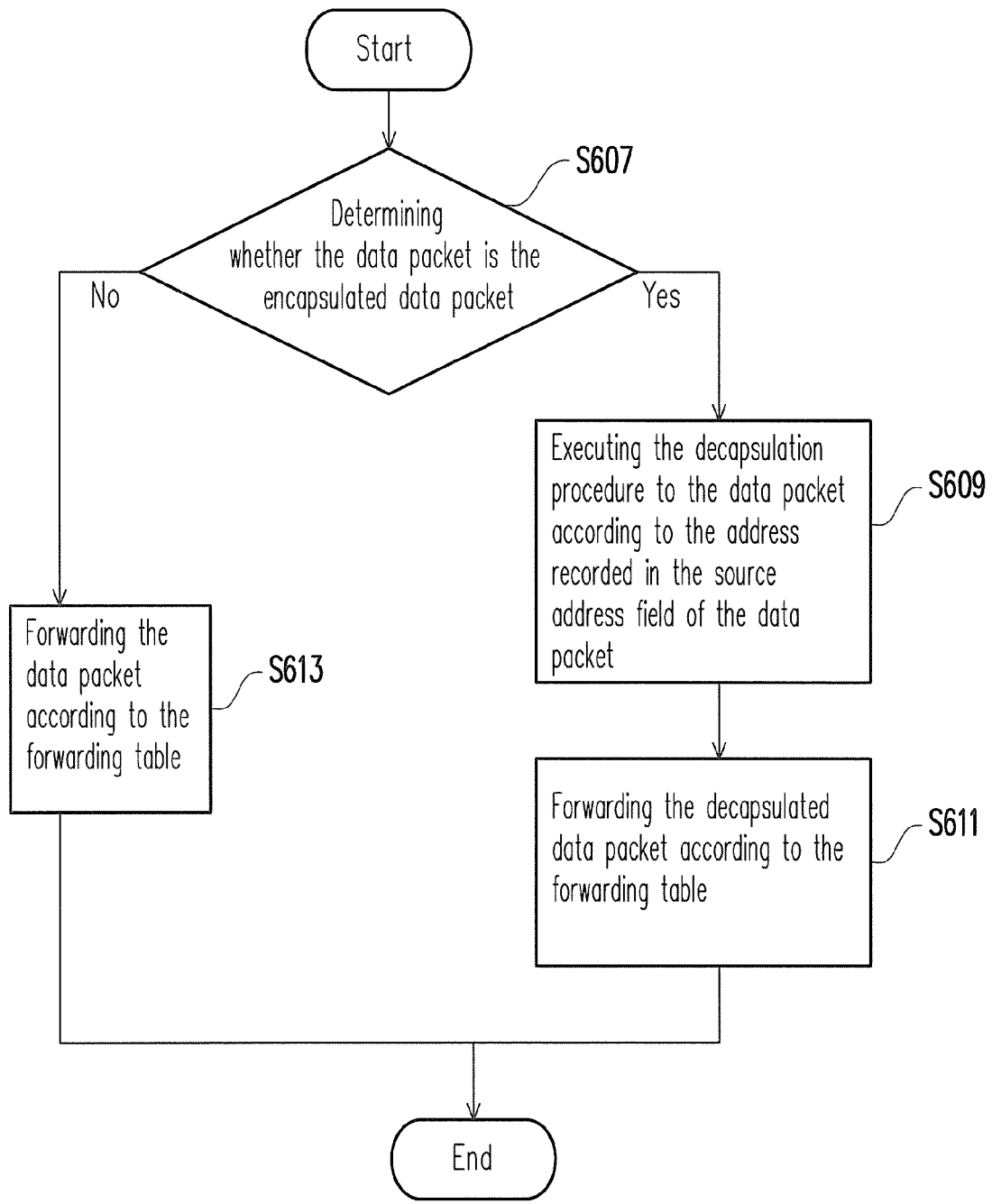

FIGS. 6A and 6B are flowcharts illustrating a packet forwarding method according to the first exemplary embodiment of the disclosure, in which FIG. 6A illustrates steps that a physical machine transmits the data packet in the indirect route mode, and FIG. 6B illustrates steps that a network switch forwards the data packet in the indirect route mode.

Referring to FIG. 6A, when the physical machine (for example, the first physical machine 312) is about to transmit a data packet (for example, the first virtual machine 312a is about to transmit the data packet to the second virtual machine 314a), in step S601, an encapsulation module of the physical machine redirects an ARP request to the management server 302, and receives a logical MAC address from the management server 302.

Then, in step S603, the encapsulation module of the physical machine executes the encapsulation procedure on the data packet to be transmitted according to the received logical MAC address. In detail, in the step S603, the encapsulation module of the physical machine puts the least significant bytes of the destination address of the data packet and the least significant bytes of the source address of the data packet in the source address field of the Ethernet header of the data packet, and puts the logical MAC address received from the management server 302 in the destination address field of the Ethernet header the data packet. The method of encapsulating the data packet has been described in detail with reference of FIG. 4, so that a detailed description thereof is not repeated.

Finally, in step S605, the physical machine sends the encapsulated data packet.

The encapsulated data packet is forwarded in the data center network system 300 according to the Ethernet protocol, and when a network switch corresponding to the destination address field of the Ethernet header of the data packet receives the data packet, the network switch executes the decapsulation procedure according to the steps shown in FIG. 6B.

Referring to FIG. 6B, in step S607, a decapsulation module of the network switch determines whether the data packet is the encapsulated data packet. For example, in the step S607, the decapsulation module of the network switch determines whether the value recorded in the first part of the source address field of the data packet is 0, and when the value recorded in the first part of the destination address field of the data packet is not 0, the decapsulation module determines that the data packet is the encapsulated data packet.

If the data packet is the encapsulated data packet, in the step S609, the decapsulation module of the network switch executes the decapsulation procedure on the data packet according to the address recorded in the source address field of the data packet. In detail, in the step S609, the decapsulation module of the network switch restores the value recorded in the first part of the source address field of the data packet into the logical MAC address of the receiver, and puts the logical MAC address of the receiver in the destination address field of the data packet. Moreover, in the step S609, the decapsulation module of the network switch restores the value recorded in the second part of the source address field of the data packet into the logical MAC address of the transmitter, and puts the logical MAC address of the transmitter in the source address field of the data packet. The method of decapsulating the data packet has been described in detail with reference of FIG. 5, so that a detailed description thereof is not repeated.

Then, in step S611, the network switch forwards the decapsulated data packet according to its forwarding table.

If the data packet is not the encapsulated data packet, in the step S613, the network switch forwards the data packet according to the forwarding table.

Second Exemplary Embodiment

Figure 7:
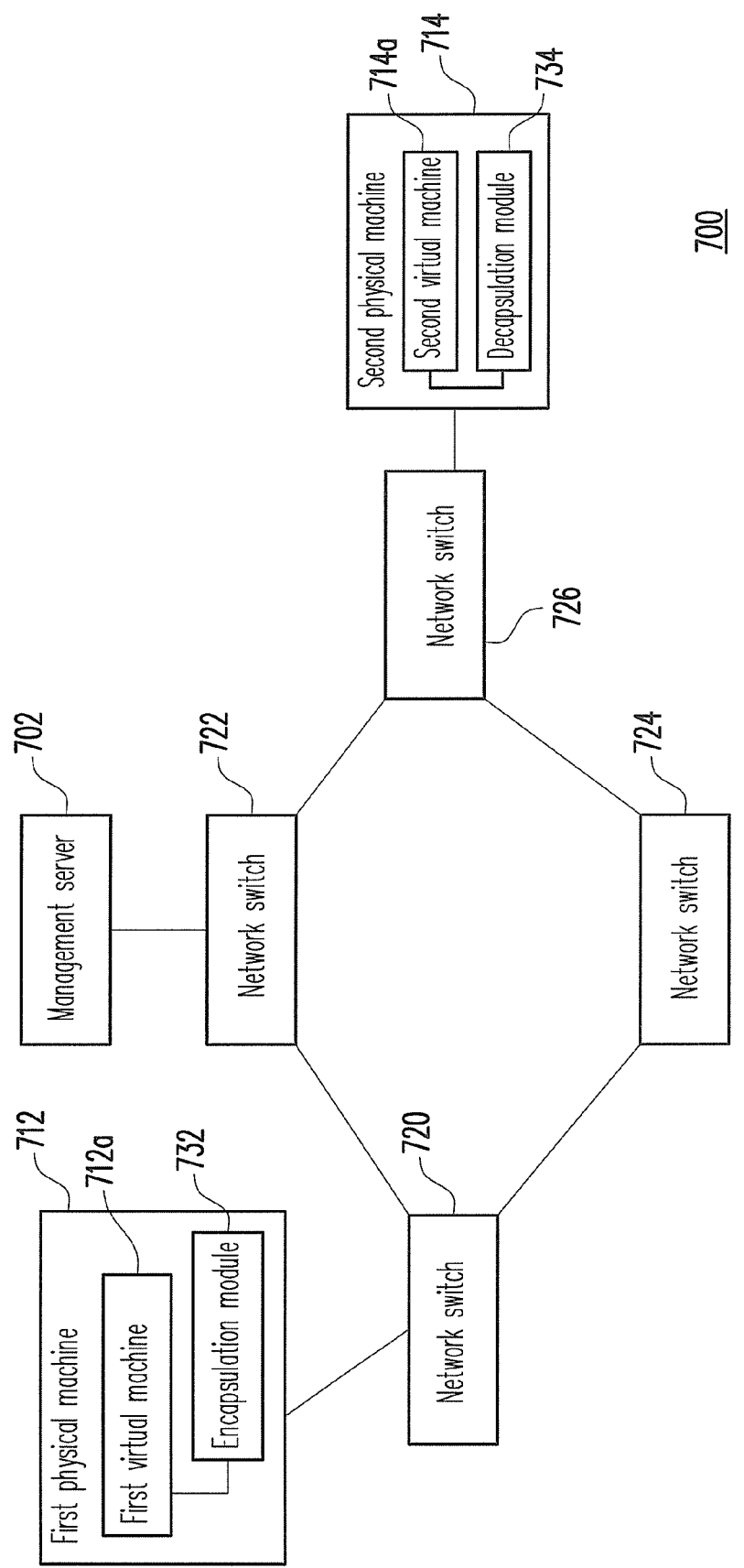
FIG. 7 is a schematic diagram illustrating a data center network system according to a second exemplary embodiment of the disclosure.

FIG. 7 is a schematic diagram illustrating a data center network system according to a second exemplary embodiment of the disclosure.

Referring to FIG. 7, the data center network system 700 includes a management server 702, a first physical machine 712, a first virtual machine 712a, a second physical machine 714, a second virtual machine 714a, a network switch 720, a network switch 722, a network switch 724 and a network switch 726.

The first physical machine 712 has an encapsulation module 732. Moreover, the virtual physical machine 712a and the second virtual machine 714a are respectively run on the first physical machine 712 and the second physical machine 714 for providing corresponding services. The management server 702, the first physical machine 712, the encapsulation module 732, the first virtual machine 712a and the second virtual machine 714a are respectively the same to the management server 302, the first physical machine 312, the encapsulation module 332, the first virtual machine 312a and the second virtual machine 314a of the first exemplary embodiment, so that detailed descriptions thereof are not repeated.

The network switch 720, the network switch 722, the network switch 724 and the network switch 726 are configured between the management server 702, the first physical machine 712 and the second physical machine 714 for forwarding data packets.

Especially, the second physical machine 714 has a decapsulation module 734, and a function thereof is the same to the decapsulation module 334 of the first exemplary embodiment. Namely, in the second exemplary embodiment, the encapsulated data packet is forwarded to the second physical machine 714 for executing the aforementioned decapsulation procedure.

Similar to the first exemplary embodiment, the forwarding tables of the network switches in the data center network system 700 are unnecessary to store address information of all of the virtual machines, so that the number of the virtual machines in the data center network system 700 can be expanded under limited forwarding table entries.

It should be noticed that in another exemplary embodiment of the disclosure, the second physical machine 714 may also have a corresponding encapsulation module for executing the aforementioned encapsulation procedure to the data packet to be transmitted. Moreover, the first physical machine 712 may also have a corresponding decapsulation module for executing the aforementioned decapsulation procedure to the received data packet.

Figure 8A:
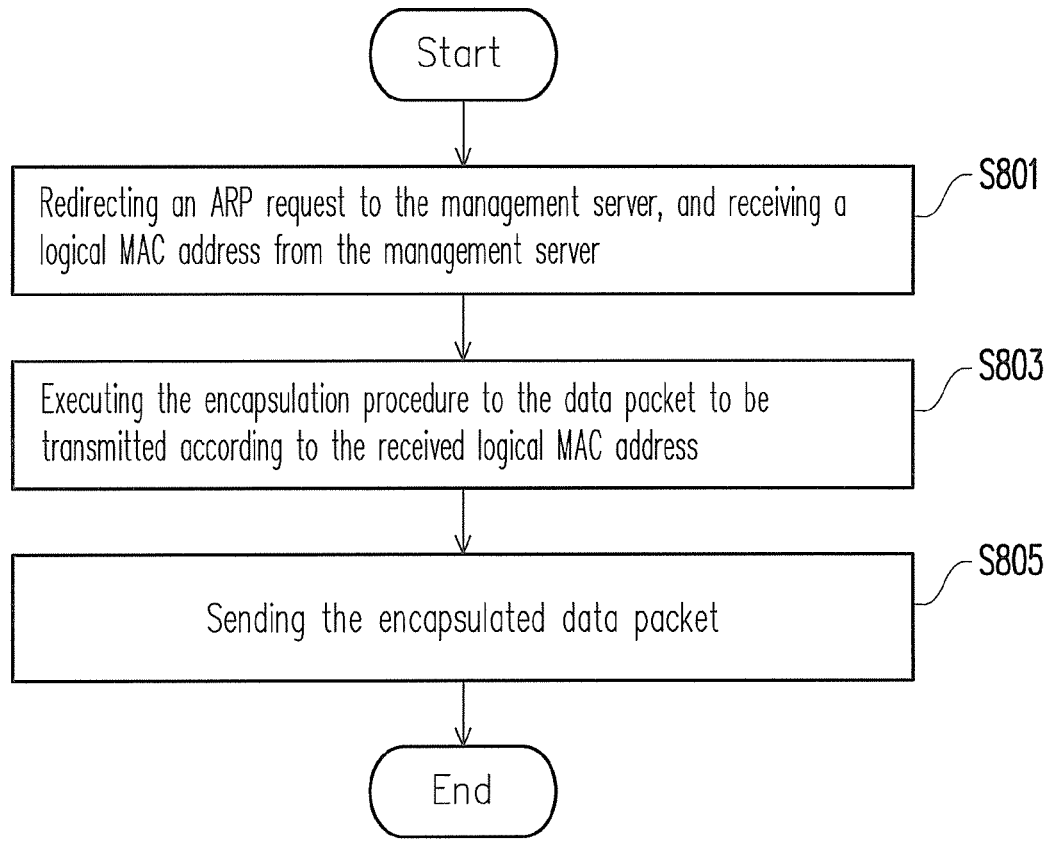
FIGS. 8A and 8B are flowcharts illustrating a packet forwarding method according to the second exemplary embodiment of the disclosure.
Figure 8B:
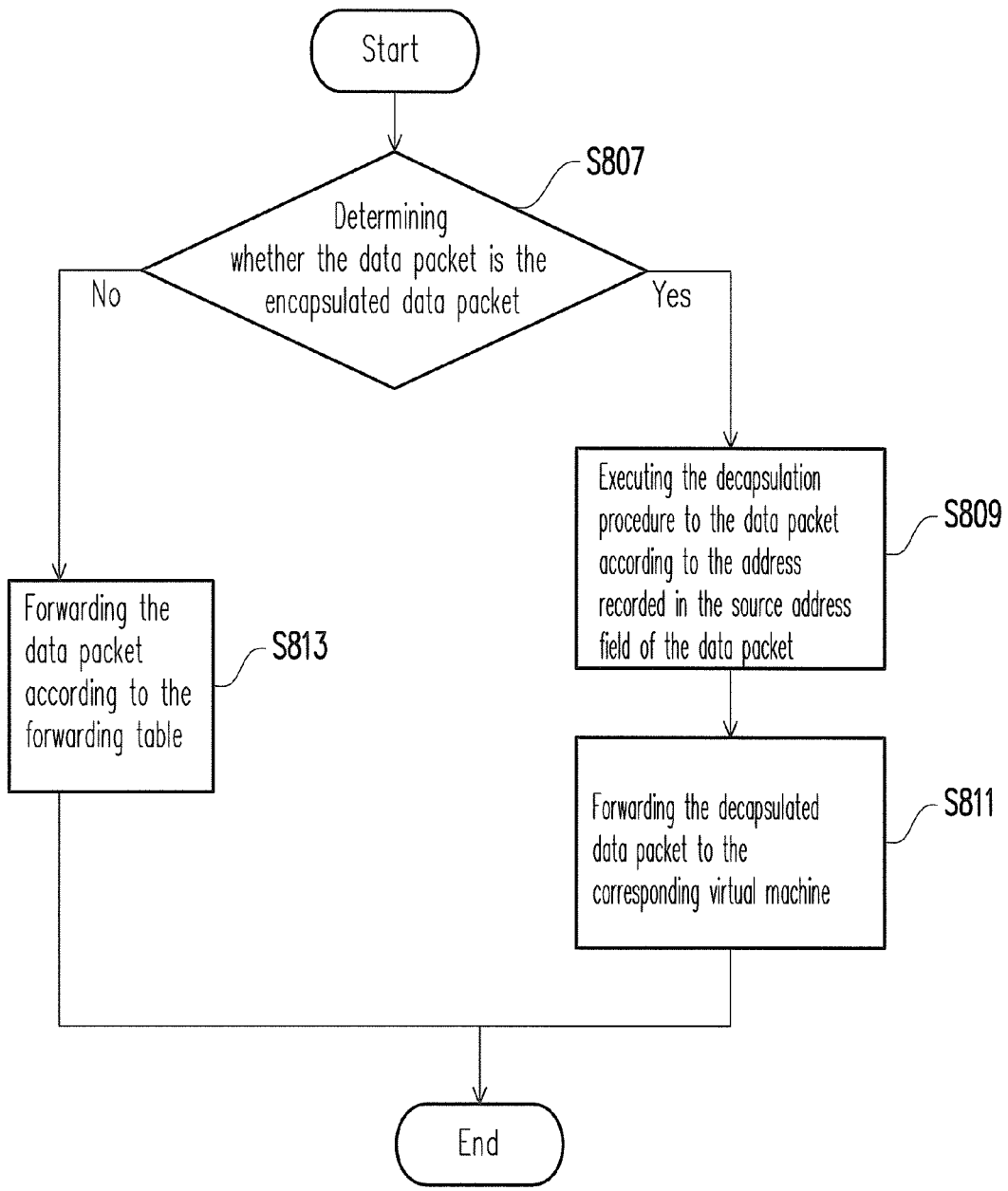

FIGS. 8A and 8B are flowcharts illustrating a packet forwarding method according to the second exemplary embodiment of the disclosure, in which FIG. 8A illustrates steps that a physical machine transmits a data packet in the indirect route mode, and FIG. 8B illustrates steps that a physical machine forwards the data packet in the indirect route mode.

Referring to FIG. 8A, when the physical machine (for example, the first physical machine 712) is about to transmit a data packet (for example, the first virtual machine 712a is about to transmit the data packet to the second virtual machine 714a), in step S801, an encapsulation module of the physical machine redirects an ARP request to the management server 702, and receives a logical MAC address from the management server 702.

Then, in step S803, the encapsulation module of the physical machine executes the encapsulation procedure on the data packet to be transmitted according to the received logical MAC address. In detail, in the step S803, the encapsulation module of the physical machine puts the least significant bytes of the destination address of the data packet and the least significant bytes of the source address of the data packet in a source address field of an Ethernet header of the data packet, and puts the logical MAC address received from the management server 702 in a destination address field of the Ethernet header the data packet. The method of encapsulating the data packet has been described in detail with reference of FIG. 4, so that a detailed description thereof is not repeated.

Finally, in step S805, the physical machine sends the encapsulated data packet.

The encapsulated data packet is forwarded in the data center network system 700 according to the Ethernet protocol, and when a physical machine corresponding to the destination address field of the Ethernet header of the data packet receives the data packet, the physical machine executes the decapsulation procedure according to the steps shown in FIG. 8B.

Referring to FIG. 8B, in step S807, a decapsulation module of the physical machine determines whether the data packet is the encapsulated data packet. For example, in the step S807, the decapsulation module of the physical machine determines whether the value recorded in the first part of the source address field of the data packet is 0, and when the value recorded in the first part of the destination address field of the data packet is not 0, the decapsulation module determines that the data packet is the encapsulated data packet.

If the data packet is the encapsulated data packet, in the step S809, the decapsulation module of the physical machine executes the decapsulation procedure to the data packet according to the address recorded in the source address field of the data packet. In detail, in the step S809, the decapsulation module of the physical machine restores the value recorded in the first part of the source address field of the data packet into the logical MAC address of the receiver, and puts the logical MAC address of the receiver in the destination address field of the data packet. Moreover, in the step S809, the decapsulation module of the physical machine restores the value recorded in the second part of the source address field of the data packet into the logical MAC address of the transmitter, and puts the logical MAC address of the transmitter in the source address field of the data packet. The method of decapsulating the data packet has been described in detail with reference of FIG. 5, so that a detailed description thereof is not repeated.

Then, in step S811, the physical machine forwards the decapsulated data packet to the corresponding virtual machine.

If the data packet is not the encapsulated data packet, in the step S813, the physical machine forwards the data packet according to the forwarding table.

Third Exemplary Embodiment

In the first exemplary embodiment, the decapsulation procedure is executed by the network switch in the data center network system, and in the second exemplary embodiment, the decapsulation procedure is executed by the physical machine in the data center network system. In the third exemplary embodiment, a part of the data packets is decapsulated by the network switch, and another part of the data packets is decapsulated by the physical machine.

Figure 9:
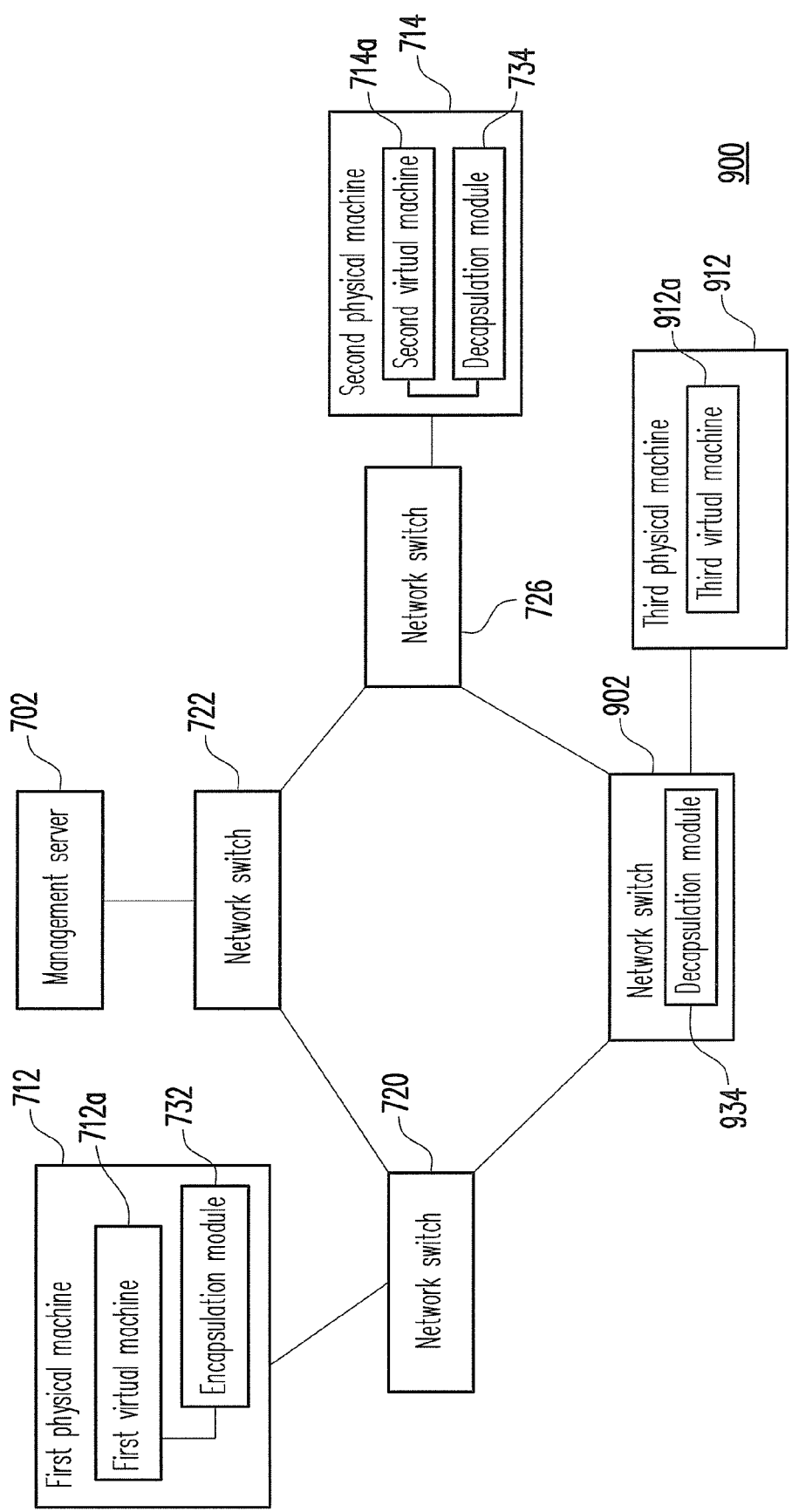
FIG. 9 is a schematic diagram illustrating a data center network system according to a third exemplary embodiment of the disclosure.

FIG. 9 is a schematic diagram illustrating a data center network system according to a third exemplary embodiment of the disclosure.

Referring to FIG. 9, the data center network system 900 includes a management server 702, a first physical machine 712, a first virtual machine 712a, a second physical machine 714, a second virtual machine 714a, a third physical machine 912, a third virtual machine 912a, a network switch 720, a network switch 722, a network switch 726 and a network switch 902.

Structures and functions of the management server 702, the first physical machine 712, the first virtual machine 712a, the second physical machine 714, the second virtual machine 714a, the network switch 720, the network switch 722 and the network switch 726 are the same as that described in the second exemplary embodiment, so that detailed descriptions thereof are not repeated.

The third physical machine 912 is communicated with the other machines or servers in the data center network system 900 through the network switch 902, and the third virtual machine 912a is run on the third physical machine 912 for providing corresponding services.

In the present exemplary embodiment, a data packet to be transmitted from the first virtual machine 712a to the second virtual machine 714a, and a data packet to be transmitted from the first virtual machine 712a to the third virtual machine 912a are all encapsulated by the encapsulation module 732.

In detail, when the first virtual machine 712a is about to transmit the data packet to the second virtual machine 714a, a logical MAC address sent to the first physical machine 712 by the management server 702 in response to the ARP request is the logical MAC address of the second physical machine 714, and the first physical machine 712 executes the encapsulation procedure on the data packet to be transmitted to the second virtual machine 714a according to the logical MAC address of the second physical machine 714. Moreover, when the first virtual machine 712a is about to transmit the data packet to the third virtual machine 912a, a logical MAC address sent to the first physical machine 712 by the management server 702 in response to the ARP request is the logical MAC address of the network switch 902, and the first physical machine 712 executes the encapsulation procedure on the data packet to be transmitted to the third virtual machine 912a according to the logical MAC address of the network switch 902.

In this way, when the data packet to be transmitted to the second virtual machine 714a is forwarded to the second physical machine 714, the second physical machine 714 executes the decapsulation procedure and transmits the decapsulated data packet to the second virtual machine 714a. Comparatively, when the data packet to be transmitted to the third virtual machine 912a is forwarded to the network switch 902, the network switch 902 executes the decapsulation procedure and transmits the decapsulated data packet to the third virtual machine 912a.

Similar to the first exemplary embodiment, the forwarding tables of the network switches in the data center network system 900 are unnecessary to store address information of all of the virtual machines, so that the number of the virtual machines in the data center network system 900 can be expanded under limited forwarding table entries.

Fourth Exemplary Embodiment

The physical machines of the first, the second and the third exemplary embodiments forward the data packets in the indirect route mode, though in the present exemplary embodiment, a part of the data packets is forwarded in the indirect route mode, and another part of the data packet is forwarded in the direct route mode.

Figure 10:
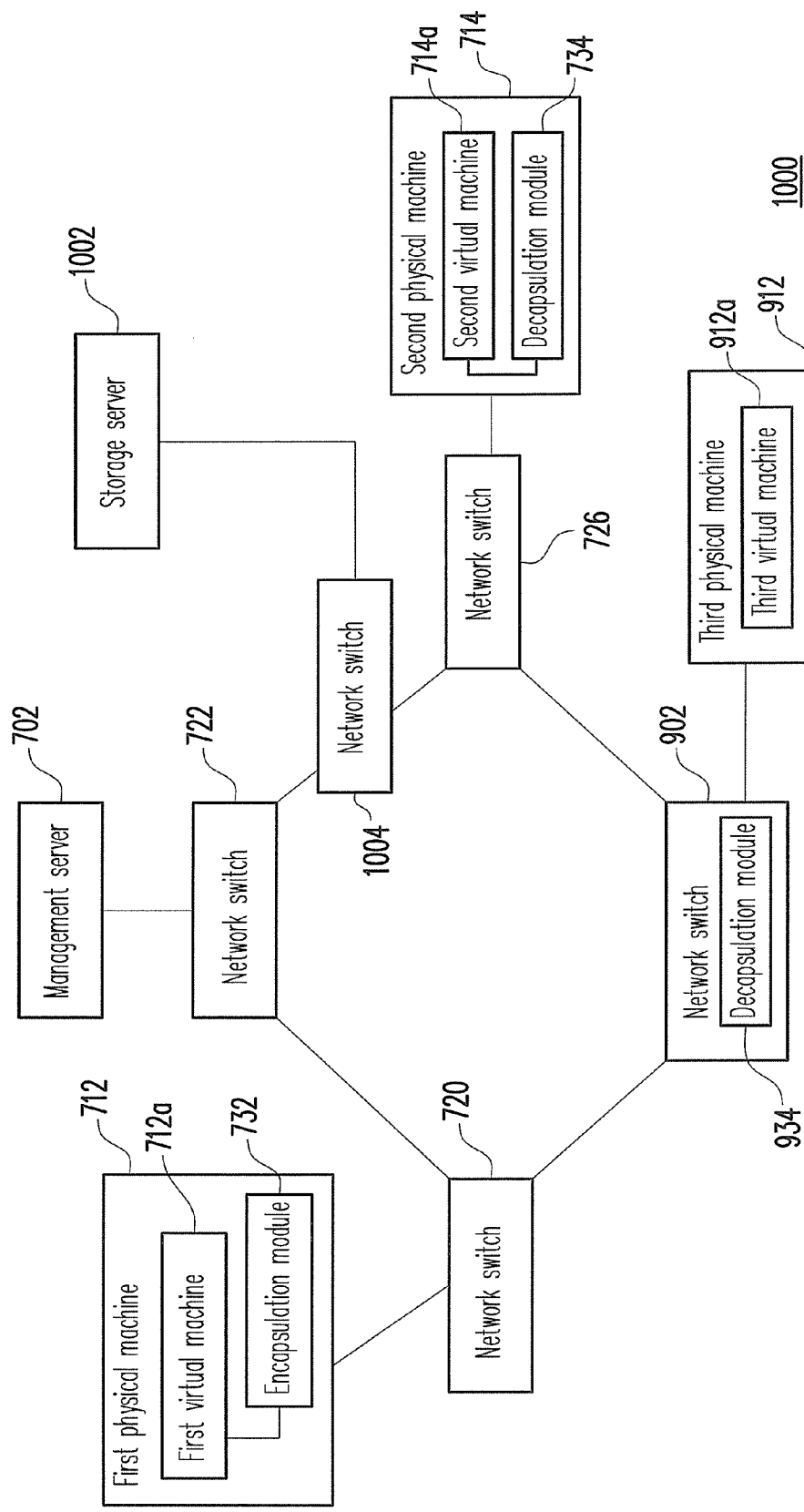
FIG. 10 is a schematic diagram illustrating a data center network system according to a fourth exemplary embodiment of the disclosure.

FIG. 10 is a schematic diagram illustrating a data center network system according to a fourth exemplary embodiment of the disclosure.

Referring to FIG. 10, the data center network system 1000 includes a management server 702, a first physical machine 712, a first virtual machine 712a, a second physical machine 714, a second virtual machine 714a, a third physical machine 912, a third virtual machine 912a, a storage server 1002, a network switch 720, a network switch 722, a network switch 726, a network switch 902 and a network switch 1004.

Structures and functions of the management server 702, the first physical machine 712, the first virtual machine 712a, the second physical machine 714, the second virtual machine 714a, the third physical machine 912, the third virtual machine 912a, the storage server 1002, the network switch 720, the network switch 722, the network switch 726, the network switch 902 and the network switch 1004 are the same as that described in the third exemplary embodiment, so that detailed descriptions thereof are not repeated.

The storage server 1002 is communicated with other machines in the data center network system 1000 through the network switch 1004.

In the present exemplary embodiment, the management server 702 establishes source-destination pairs according to the machines and the servers in the data center network system 1000, and configures a corresponding transmission mode for each of the source-destination pairs. Namely, the data packet transmitted between each of the source-destination pairs is transmitted according to the transmission mode configured by the management server 702 in either the indirect route mode or the direct route mode. Here, the so-called indirect route mode is referred to a transmission mode that the encapsulation procedure is executed on the data packet to be transmitted according to the logical MAC address of the intermediate node, and the intermediate node executes the decapsulation procedure to continually forward the data packet to the true logical MAC address as that described in the first, the second and the third exemplary embodiments. Comparatively, the direct route mode is referred to that the data packet is transmitted according to the Ethernet protocol without executing the aforementioned encapsulation procedure and the decapsulation procedure.

The management server 702 may periodically count a data packet traffic volume of each of the source-destination pairs in the data center network system 1000, and assigns the transmission mode of each of the source-destination pairs according to the counted data packet traffic volumes. For example, regarding the source-destination pairs with relatively larger data packet traffic volumes, the management server 702 sets the transmission modes of these source-destination pairs as the direct route mode, and regarding the source-destination pairs with relatively smaller data packet traffic volumes, the management server 702 sets the transmission modes of these source-destination pairs as the indirect route mode.

In detail, the management server 702 sorts the source-destination pairs according to the data packet traffic volumes thereof in a sequence from large to small, and assigns the transmission mode of each of the source-destination pairs as the direct route mode according to such priority sequence, wherein each time when the direct route mode is assigned, one forwarding table entry of the forwarding table of the network switch is used. Such assignment is repeated until the forwarding table entries are exhausted, and the transmission modes of the remained unassigned source-destination pairs are set as the indirect route mode.

For example, assuming the management server 702 sorts a priority sequence of the amount of the data packets sent from the first physical machine to the other machines to be as that shown in FIG. 11, and the forwarding table of the network switch 720 can only stores 3 extra forwarding table entries, the management server 702 sets the transmission modes of the front 3 source-destination pairs shown in FIG. 11 as the direct route mode, and sets the transmission modes of the other source-destination pairs as the indirect route mode. Namely, when the ARP request is sent to the management server 702 in order to transmit the data packet from the first virtual machine 712*a* to the storage server 1002, the management server 702 replies the logical MAC address of the storage server 1002 to the first physical machine 712 according to the direct route mode of such source-destination pair, so that the data packet is transmitted from the first virtual machine 712*a* to the storage server 1002 in the direct route mode. Moreover, when the ARP request is sent to the management server 702 in order to transmit the data packet from the first virtual machine 712*a* to the third virtual machine 912*a*, the management server 702 replies the logical MAC address of the network switch 902 to the first physical machine 712 according to the indirect route mode of such source-destination pair, so that the data packet is transmitted from the first virtual machine 712*a* to the third virtual machine 912*a* in the indirect route mode.

In the present exemplary embodiment, the operation that the management server 702 periodically counts the data packet traffic volume of each of the source-destination pairs in the data center network system 1000 refers to that the management server 702 counts the number of the data packets transmitted between each of the source-destination pairs every a predetermined time (for example, every hour, every two hours or every day), and counts the data packet traffic volume of each of the source-destination pairs according to a predetermined rule. For example, the management server 702 accumulates the number of the data packets transmitted in the past hour and before one hour in a weighted approach to serve as the data packet traffic volume of the source-destination pair.

During the operation of the data center network system 1000, a virtual machine can be migrated from one physical machine to another physical machine. To avoid greatly changing the forwarding table entries in the forwarding table, the management server 702 sets all the transmission modes of the source-destination pairs corresponding to the migrated virtual machine as the indirect route mode. Moreover, when the management server 702 again counts the data packet traffic volume of each of the source-destination pairs in the data center network system 1000 to update the transmission mode of each of the source-destination pairs, the transmission mode of the source-destination pair corresponding to the migrated virtual machine is suitably set according its data packet traffic volume.

It should be noticed that besides arranging the priority sequence of the source-destination pairs according to the data packet traffic volumes, the management server 702 can also arrange the priority sequence of the source-destination pairs according to features of the machines in the data center network system 1000. For example, the management server 702 classifies the source-destination pair in which a sources end is the physical machine and a destination end is the physical machine as a physical machine-physical machine group; classifies the source-destination pair in which the sources end is the virtual machine and the destination end is the management server as a virtual machine-management server group; classifies the source-destination pair in which the sources end is the virtual machine and the destination end is the storage server as a virtual machine-storage server group; and classifies the source-destination pair in which the sources end is the virtual machine and the destination end is the virtual machine as a virtual machine-virtual machine group. Moreover, the priority sequence of the source-destination pairs is generated sequentially according to the physical machine-physical machine group, the virtual machine-management server group, the virtual machine-storage server group and the virtual machine-virtual machine group.

Figure 12:
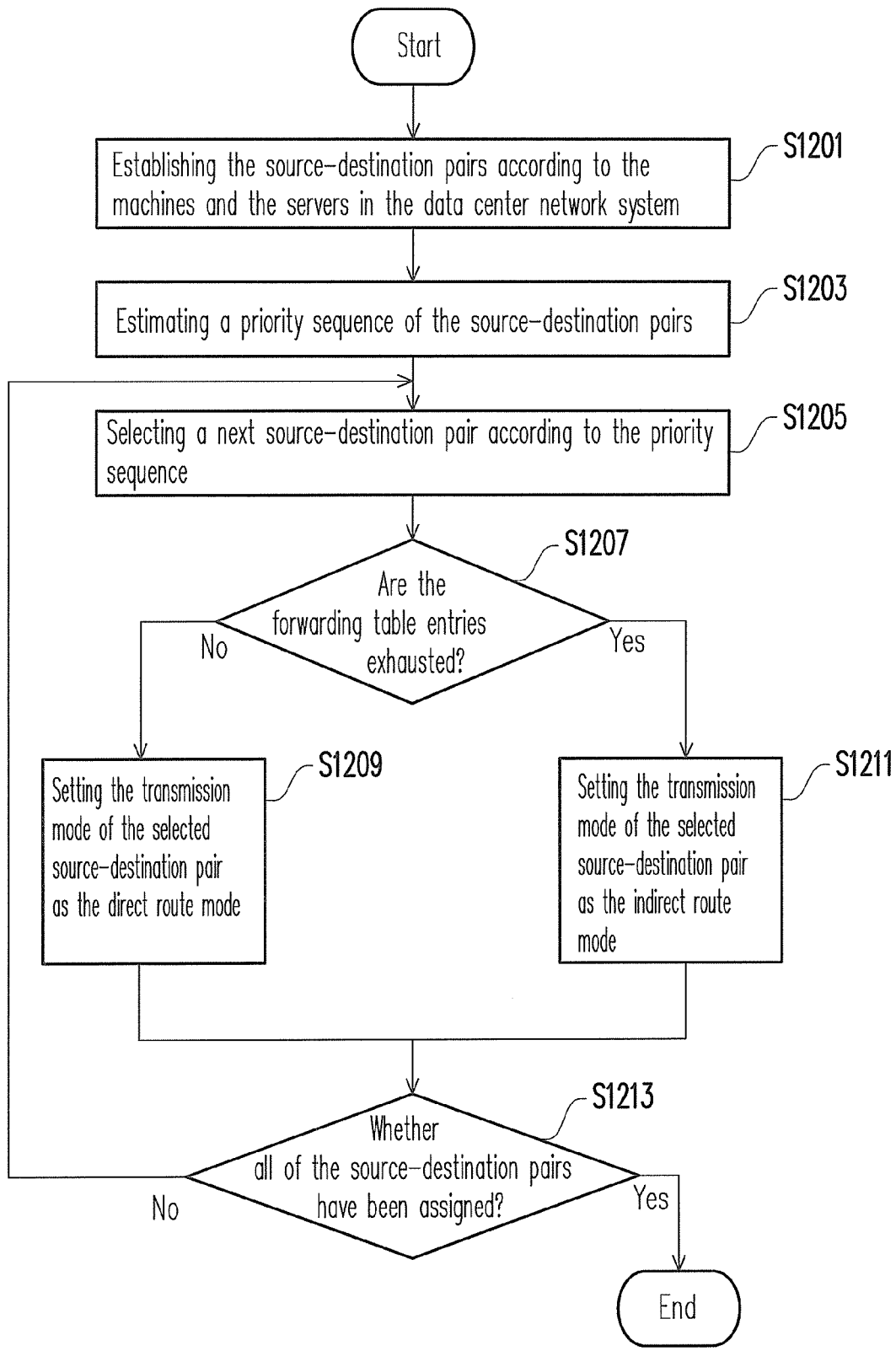
FIG. 12 is a flowchart illustrating a packet forwarding method according to the fourth exemplary embodiment of the disclosure.

FIG. 12 is a flowchart illustrating a packet forwarding method according to the fourth exemplary embodiment of the disclosure, in which steps that the management server assigns the transmission mode are presented.

Referring to FIG. 12, in step S1201, the management server 702 establishes the source-destination pairs according to the machines and the servers in the data center network system 1000.

Then, in step S1203, the management server 702 estimates a priority sequence of the source-destination pairs. In detail, the management server 702 can estimate the priority sequence according to the data packet traffic volumes of the source-destination pairs or the features of the source-destination pairs.

Then, in step S1205, the management server 702 selects a next source-destination pair according to the priority sequence, and in step S1207, the management server 702 determines whether the forwarding table entries are exhausted.

If the forwarding table entries are not exhausted, in step S1209, the management server 702 sets the transmission mode of the selected source-destination pair as the direct route mode, and if the forwarding table entries are exhausted, in step S1211, the management server 702 sets the transmission mode of the selected source-destination pair as the indirect route mode.

Then, in step S1213, the management server 702 determines whether all of the source-destination pairs have been assigned, and if all of the source-destination pairs have not been assigned, the step S1205 is repeated. Conversely, the flow of FIG. 12 is terminated.

In summary, in the packet forwarding method of the exemplary embodiment of the disclosure, the encapsulation procedure is executed to change the destination address field and the source address field in the Ethernet header of the data packet, so as to forward the data packet to the intermediate node. Then, the intermediate node executes the decapsulation procedure to identify a true destination of such data packet, and correctly forwards such data packet. In this way, the number of the forwarding table entries required to be stored in the network switches of the data center network system can be effectively reduced, and the amount of the virtual machines used in the data center network system can be effectively expanded. Moreover, in the packet forwarding method of the exemplary embodiment of the disclosure, the transmission mode of each of the source-destination pairs is assigned as the direct route mode or the indirect route mode according to the priority sequence of the source-destination pairs in the data center network system, so as to reduce a burden of the network switch through such dual-mode technique.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data center network system, comprising:
a first physical machine;
a first virtual machine, run on the first physical machine;
a second physical machine;
a second virtual machine, run on the second physical machine, wherein the first virtual machine is configured for sending a data packet to the second virtual machine, and the data packet has a destination address field and a source address field;
a network switch, configured for forwarding the data packet; and
a management server, wherein the first physical machine, the second physical machine, the network switch and the management server communicate with each other according to an Ethernet protocol,
wherein the management server configures a corresponding logical media access control address for each of the first physical machine, the first virtual machine, the network switch, the second physical machine and the second virtual machine, wherein each of the logical media access control addresses comprises most significant bytes and least significant bytes, and the most significant bytes are set as 0,
wherein the management server provides the logical media access control address of the network switch to the first physical machine,
wherein the first physical machine has an encapsulation module, and the encapsulation module is configured for encapsulating the data packet from the first virtual machine, wherein the logical media access control address of the network switch is put in the destination address field of the encapsulated data packet, and the least significant bytes of the logical media access control address of the first virtual machine and the least significant bytes of the logical media access control address of the second virtual machine are put in the source address field of the encapsulated data packet,
wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the network switch is put in a single destination address field, wherein the length of the encapsulated data packet is not extended and no new header is added into the encapsulated data packet,
wherein the first physical machine sends the encapsulated data packet,
wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

2. The data center network system as claimed in claim 1, wherein the network switch receives the encapsulated data packet and has a decapsulation module,
wherein the decapsulation module is configured for decapsulating the received data packet,
wherein the logical media access control address of the second virtual machine is put in the destination address field of the decapsulated data packet, and the logical media access control address of the first virtual machine is put in the source address field of the decapsulated data packet,
wherein the network switch further forwards the decapsulated data packet to the second physical machine, and the second physical machine forwards the decapsulated data packet to the second virtual machine.

3. The data center network system as claimed in claim 1, wherein a length of the most significant bytes is the same to a length of the least significant bytes.

4. The data center network system as claimed in claim 1, wherein the encapsulation module of the first physical machine divides the source address field of the encapsulated data packet into a first part and a second part following the first part,
wherein the encapsulation module puts the least significant bytes of the logical media access control address of the second virtual machine in the first part of the source address field, and puts the least significant bytes of the logical media access control address of the first virtual machine in the second part of the source address field.

5. The data center network system as claimed in claim 4, wherein the decapsulation module determines whether a value recorded in the first part of the source address field of the received data packet is 0, and decapsulates the received data packet when the value recorded in the first part of the source address field of the received data packet is not 0.

6. The data center network system as claimed in claim 1, further comprising at least one other network switch configured for forwarding the data packet.

7. A data center network system, comprising:
a first physical machine;
a first virtual machine, run on the first physical machine;
a second physical machine;
a second virtual machine, run on the second physical machine, wherein the first virtual machine is configured for sending a data packet to the second virtual machine, and the data packet has a destination address field and a source address field; and
a management server, wherein the first physical machine, the second physical machine and the management server communicate with each other according to an Ethernet protocol,
wherein the management server configures a corresponding logical media access control address for each of the first physical machine, the first virtual machine, the second physical machine and the second virtual machine, wherein each of the logical media access control addresses comprises most significant bytes and least significant bytes, and the most significant bytes are set as 0,
wherein the management server provides the logical media access control address of the second physical machine to the first physical machine,
wherein the first physical machine has an encapsulation module, and the encapsulation module is configured for encapsulating the data packet from the first virtual machine, wherein the logical media access control address of the second physical machine is put in the destination address field of the encapsulated data packet, and the least significant bytes of the logical media access control address of the first virtual machine and the least significant bytes of the logical media access control address of the second virtual machine are put in the source address field of the encapsulated data packet,
wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the second physical machine is put in a single destination address field, wherein the length of the encapsulated data packet is not extended and no new header is added into the encapsulated data packet,
wherein the first physical machine sends the encapsulated data packet,
wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

8. The data center network system as claimed in claim 7, wherein the second physical machine receives the encapsulated data packet and has a decapsulation module,
wherein the decapsulation module is configured for decapsulating the received data packet,
wherein the logical media access control address of the second virtual machine is put in the destination address field of the decapsulated data packet, and the logical media access control address of the first virtual machine is put in the source address field of the decapsulated data packet,
wherein the second physical machine forwards the decapsulated data packet to the second virtual machine.

9. The data center network system as claimed in claim 7, wherein a length of the most significant bytes is the same to a length of the least significant bytes.

10. The data center network system as claimed in claim 7, wherein the encapsulation module of the first physical machine divides the source address field of the encapsulated data packet into a first part and a second part following the first part,
wherein the encapsulation module puts the least significant bytes of the logical media access control address of the second virtual machine in the first part of the source address field, and puts the least significant bytes of the logical media access control address of the first virtual machine in the second part of the source address field.

11. The data center network system as claimed in claim 10, wherein the decapsulation module determines whether a value recorded the first part of the source address field of the received data packet is 0, and decapsulates the received data packet when the value recorded in the first part of the source address field of the received data packet is not 0.

12. The data center network system as claimed in claim 7, further comprising at least one network switch configured for forwarding the data packet.

13. A data center network system, comprising:
a plurality of machines, comprising a plurality of physical machines and a plurality of virtual machines, wherein each of the virtual machines is belonged to one of the physical machines;
a plurality of network switches, wherein the physical machines are connected through the network switches; and
a management server, configured for respectively configuring corresponding logical media access control addresses for the machines and the network switches, wherein each of the logical media access control addresses comprises most significant bytes and least significant bytes, and the most significant bytes are set as 0,
wherein the machines, the network switches and the management server communicate with each other according to an Ethernet protocol,
wherein the management server establishes a plurality of source-destination pairs according to the machines, estimates a priority sequence of the source-destination pairs, and assigns a transmission mode corresponding to each of the source-destination pairs to be a direct route mode or an indirect route mode according to the priority sequence and a plurality of forwarding table entries of each of the network switches,
wherein when the indirect route mode is applied to send a data packet from a first virtual machine in the virtual machines to a second virtual machine in the virtual machines, a first physical machine corresponding to the first virtual machine identifies a network switch corresponding to the second virtual machine, encapsulates the data packet according to the identified network switch, and sends the encapsulated data packet,
wherein the management server provides the logical media access control address of the network switch corresponding to the second virtual machine to the first physical machine, wherein the encapsulated data packet has a destination address field and a source address field, the logical media access control address of the network switch corresponding to the second virtual machine is put in the destination address field of the encapsulated data packet, and the least significant bytes of the logical media access control address of the first virtual machine and the least significant bytes of the logical media access control address of the second virtual machine are put in the source address field of the encapsulated data packet, wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the network switch is put in a single destination address field, wherein the length of the encapsulated data packet is not extended and no new header is added into the encapsulated data packet, wherein the first physical machine corresponding to the first virtual machine is one of the physical machines, and the network switch corresponding to the second virtual machine is one of the network switches, wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

14. The data center network system as claimed in claim 13, wherein the management server periodically calculates a data packet traffic volume of each of the source-destination pairs and sorts the source-destination pairs according to the data packet traffic volumes of the source-destination pairs to generate the priority sequence.

15. The data center network system as claimed in claim 13, further comprising at least one storage server,
wherein the management server divides the source-destination pairs into a physical machine-physical machine group, a virtual machine-management server group, a virtual machine-storage server group and a virtual machine-virtual machine group, and the priority sequence of the source-destination pairs is generated sequentially according to the physical machine-physical machine group, the virtual machine-management server group, the virtual machine-storage server group and the virtual machine-virtual machine group.

16. The data center network system as claimed in claim 13, wherein the management server selects one of the source-destination pairs according to the priority sequence, and determines whether the forwarding table entries are exhausted,
wherein when the forwarding table entries are not exhausted, the management server uses one of the forwarding table entries to assign the transmission mode of the selected source-destination pair as the direct route mode,
wherein when the forwarding table entries are exhausted, the management server assigns the transmission mode of the selected source-destination pair as the indirect route mode.

17. The data center network system as claimed in claim 13, wherein the network switch receives the encapsulated data packet and decapsulates the received data packet, wherein the logical media access control address of the second virtual machine is put in the destination address field of the decapsulated data packet, and the logical media access control address of the first virtual machine is put in the source address field of the decapsulated data packet,
wherein the network switch further forwards the decapsulated data packet.

18. The data center network system as claimed in claim 13, wherein a length of the most significant bytes is the same to a length of the least significant bytes.

19. The data center network system as claimed in claim 13, wherein the first physical machine divides the source address field of the encapsulated data packet into a first part and a second part following the first part, puts the least significant bytes of the logical media access control address of the second virtual machine in the first part of the source address field, and puts the least significant bytes of the logical media access control address of the first virtual machine in the second part of the source address field.

20. The data center network system as claimed in claim 13, wherein when one of the virtual machines is migrated from one of the physical machines to another one of the physical machines, the management server sets the transmission mode of each of the source-destination pairs corresponding to the one of the virtual machines as the indirect route mode.

21. A data center network system, comprising:
a plurality of machines, comprising a plurality of physical machines and a plurality of virtual machines, wherein each of the virtual machines is belonged to one of the physical machines;
a plurality of network switches, wherein the physical machines are connected through the network switches; and
a management server, configured for respectively configuring corresponding logical media access control addresses for the machines and the network switches, wherein each of the logical media access control addresses comprises most significant bytes and least significant bytes, and the most significant bytes are set as 0,
wherein the machines, the network switches and the management server communicate with each other according to an Ethernet protocol,
wherein the management server establishes a plurality of source-destination pairs according to the machines, estimates a priority sequence of the source-destination pairs, and assigns a transmission mode corresponding to each of the source-destination pairs to be a direct route mode or an indirect route mode according to the priority sequence and a plurality of forwarding table entries of each of the network switches,
wherein when the indirect route mode is applied to send a data packet from a first virtual machine in the virtual machines to a second virtual machine in the virtual machines, a first physical machine corresponding to the first virtual machine identifies a second physical machine corresponding to the second virtual machine, encapsulates the data packet according to the identified second physical machine, and sends the encapsulated data packet,
wherein the management server provides the logical media access control address of the second physical machine corresponding to the second virtual machine to the first physical machine, wherein the encapsulated data packet has a destination address field and a source address field, the logical media access control address of the second physical machine corresponding to the second virtual machine is put in the destination address field of the encapsulated data packet, and the least significant bytes of the logical media access control address of the first virtual machine and the least significant bytes of the logical media access control address of the second virtual machine are put in the source address field of the encapsulated data packet, wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the second physical machine is put in a single destination address field, wherein the length of the encapsulated data packet is not extended and no new header is added into the encapsulated data packet, wherein the first physical machine corresponding to the first virtual machine is one of the physical machines, and the second physical machine corresponding to the second virtual machine is one of the physical machines, wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

22. The data center network system as claimed in claim 21, wherein the management server periodically calculates a data packet traffic volume of each of the source-destination pairs and sorts the source-destination pairs according to the data packet traffic volumes of the source-destination pairs to generate the priority sequence.

23. The data center network system as claimed in claim 21, further comprising at least one storage server, wherein the management server divides the source-destination pairs into a physical machine-physical machine group, a virtual machine-management server group, a virtual machine-storage server group and a virtual machine-virtual machine group, and the priority sequence of the source-destination pairs is generated sequentially according to the physical machine-physical machine group, the virtual machine-management server group, the virtual machine-storage server group and the virtual machine-virtual machine group.

24. The data center network system as claimed in claim 21, wherein the management server selects one of the source-destination pairs according to the priority sequence, and determines whether the forwarding table entries are exhausted, wherein when the forwarding table entries are not exhausted, the management server uses one of the forwarding table entries to assign the transmission mode of the selected source-destination pair as the direct route mode, wherein when the forwarding table entries are exhausted, the management server assigns the transmission mode of the selected source-destination pair as the indirect route mode.

25. The data center network system as claimed in claim 21, wherein the second physical machine receives the encapsulated data packet and decapsulates the received data packet, wherein the logical media access control address of the second virtual machine is put in the destination address field of the decapsulated data packet, and the logical media access control address of the first virtual machine is put in the source address field of the decapsulated data packet, wherein the second physical machine further forwards the decapsulated data packet to the second virtual machine.

26. The data center network system as claimed in claim 21, wherein a length of the most significant bytes is the same to a length of the least significant bytes.

27. The data center network system as claimed in claim 21, wherein the first physical machine divides the source address field of the encapsulated data packet into a first part and a second part following the first part, puts the least significant bytes of the logical media access control address of the second virtual machine in the first part of the source address field, and puts the least significant bytes of the logical media access control address of the first virtual machine in the second part of the source address field.

28. The data center network system as claimed in claim 21, wherein when one of the virtual machines is migrated from one of the physical machines to another one of the physical machines, the management server sets the transmission mode of each of the source-destination pairs corresponding to the one of the virtual machines as the indirect route mode.

29. A packet forwarding method, for forwarding a data packet from a first virtual machine run on a first physical machine to a second virtual machine run on a second physical machine according to an Ethernet protocol, wherein the data packet has a destination address field and a source address field, and the second physical machine is connected to a network switch, the package forwarding method comprising:

configuring a corresponding logical media access control address for each of the first physical machine, the first virtual machine, the network switch, the second physical machine and the second virtual machine, wherein each of the logical media access control addresses comprises most significant bytes and least significant bytes, and the most significant bytes are set as 0;

obtaining the logical media access control address of the network switch from a management server;

encapsulating the data packet, wherein the logical media access control address of the network switch is put in the destination address field of the encapsulated data packet, and the least significant bytes of the logical media access control address of the first virtual machine and the least significant bytes of the logical media access control address of the second virtual machine are put in the source address field of the encapsulated data packet, wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the network switch is put in a single destination address field, wherein the length of the encapsulated data packet is not extended and no new header is added into the encapsulated data packet; and forwarding the encapsulated data packet by the first physical machine, wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

30. The packet forwarding method as claimed in claim 29, further comprising:
receiving the data packet forwarded by the first physical machine and decapsulating the received data packet, wherein the logical media access control address of the second virtual machine is put in the destination address field of the decapsulated data packet, and the logical media access control address of the first virtual machine is put in the source address field of the decapsulated data packet;
forwarding the decapsulated data packet by the network switch; and
receiving the decapsulated data packet from the network switch through the second physical machine by the second virtual machine.

31. The packet forwarding method as claimed in claim 29, wherein a length of the most significant bytes is the same to a length of the least significant bytes.

32. The packet forwarding method as claimed in claim 29, further comprising dividing the source address field of the encapsulated data packet into a first part and a second part following the first part,
wherein the step of encapsulating the data packet comprises:
putting the least significant bytes of the logical media access control address of the second virtual machine in the first part of the source address field; and
putting the least significant bytes of the logical media access control address of the first virtual machine in the second part of the source address field.

33. The packet forwarding method as claimed in claim 32, further comprising:
determining whether a value recorded in the first part of the source address field of the received data packet is 0, and decapsulating the received data packet when the value recorded in the first part of the source address field of the received data packet is not 0.

34. A packet forwarding method, for forwarding a data packet from a first virtual machine run on a first physical machine to a second virtual machine run on a second physical machine according to an Ethernet protocol, wherein the data packet has a destination address field and a source address field, the package forwarding method comprising:
configuring a corresponding logical media access control address for each of the first physical machine, the first virtual machine, the second physical machine and the second virtual machine, wherein each of the logical media access control addresses comprises most significant bytes and least significant bytes, and the most significant bytes are set as 0;
obtaining the logical media access control address of the second physical machine from a management server;
encapsulating the data packet, wherein the logical media access control address of the second physical machine is put in the destination address field of the encapsulated data packet, and the least significant bytes of the logical media access control address of the first virtual machine and the least significant bytes of the logical media access control address of the second virtual machine are put in the source address field of the encapsulated data packet, wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the second physical machine is put in a single destination address field, wherein the length of the encapsulated data packet is not extended and no new header is added into the encapsulated data packet; and
forwarding the encapsulated data packet by the first physical machine,
wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

35. The packet forwarding method as claimed in claim 34, further comprising:
receiving the data packet forwarded by the first physical machine and decapsulating the received data packet, wherein the logical media access control address of the second virtual machine is put in the destination address field of the decapsulated data packet, and the logical media access control address of the first virtual machine is put in the source address field of the decapsulated data packet; and
forwarding the decapsulated data packet to the second virtual machine by the second physical machine.

36. The packet forwarding method as claimed in claim 34, wherein a length of the most significant bytes is the same to a length of the least significant bytes.

37. The packet forwarding method as claimed in claim 34, further comprising dividing the source address field of the encapsulated data packet into a first part and a second part following the first part,
wherein the step of encapsulating the data packet comprises:
putting the least significant bytes of the logical media access control address of the second virtual machine in the first part of the source address field; and
putting the least significant bytes of the logical media access control address of the first virtual machine in the second part of the source address field.

38. The packet forwarding method as claimed in claim 37, further comprising:
determining whether a value recorded in the first part of the source address field of the received data packet is 0, and decapsulating the received data packet when the value recorded in the first part of the source address field of the received data packet is not 0.

39. A packet forwarding method, adapted to forward data packets among a plurality of machines according to an Ethernet protocol, wherein the machines comprise a plurality of physical machines and a plurality of virtual machines, each of the virtual machines is belonged to one of the physical machines, and the physical machines are connected through a plurality of network switches, the package forwarding method comprising:
respectively configuring corresponding logical media access control addresses for the physical machines, the virtual machines and the network switches, wherein each of the logical media access control addresses comprises most significant bytes and least significant bytes, and the most significant bytes are set as 0;

establishing a plurality of source-destination pairs according to the machines;

estimating a priority sequence of the source-destination pairs;

assigning a transmission mode corresponding to each of the source-destination pairs to be a direct route mode or an indirect route mode according to the priority sequence and a plurality of forwarding table entries of each of the network switches; and when the indirect route mode is applied to send a data packet from a first virtual machine in the virtual machines to a second virtual machine in the virtual machines, identifying a network switch corresponding to the second virtual machine, obtaining the logical media access control address of the network switch corresponding to the second virtual machine from a management server, encapsulating the data packet, and sending the encapsulated data packet, wherein the network switch corresponding to the second virtual machine is one of the network switches, wherein the encapsulated data packet has a destination address field and a source address field, the logical media access control address of the network switch corresponding to the second virtual machine is put in the destination address field of the encapsulated data packet, and the least significant bytes of the logical media access control address of the first virtual machine and the least significant bytes of the logical media access control address of the second virtual machine are put in the source address field of the encapsulated data packet, wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the network switch is put in a single destination address field, wherein the length of the encapsulated data packet is not extended and no new header is added into the encapsulated data packet, wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

40. The packet forwarding method as claimed in claim 39, wherein the step of estimating the priority sequence of the source-destination pairs comprises:

periodically calculating a data packet traffic volume of each of the source-destination pairs; and sorting the source-destination pairs according to the data packet traffic volumes of the source-destination pairs to generate the priority sequence.

41. The packet forwarding method as claimed in claim 39, wherein the machines further comprise at least one storage server and at least one management server, wherein the step of estimating the priority sequence of the source-destination pairs comprises:

dividing the source-destination pairs into a physical machine-physical machine group, a virtual machine-management server group, a virtual machine-storage server group and a virtual machine-virtual machine group; and generating the priority sequence of the source-destination pairs sequentially according to the physical machine-physical machine group, the virtual machine-management server group, the virtual machine-storage server group and the virtual machine-virtual machine group.

42. The packet forwarding method as claimed in claim 39, wherein the step of assigning the transmission mode corresponding to each of the source-destination pairs to be the direct route mode or the indirect route mode according to the priority sequence and the forwarding table entries of each of the network switches comprises:

selecting one of the source-destination pairs according to the priority sequence;

determining whether the forwarding table entries are exhausted;

when the forwarding table entries are not exhausted, using one of the forwarding table entries to assign the transmission mode of the selected source-destination pair as the direct route mode; and when the forwarding table entries are exhausted, assigning the transmission mode of the selected source-destination pair as the indirect route mode.

43. The packet forwarding method as claimed in claim 39, further comprising:

when the network switch corresponding to the second virtual machine receives the encapsulated data packet, decapsulating the received data packet, wherein the logical media access control address of the second virtual machine is put in the destination address field of the decapsulated data packet, and the logical media access control address of the first virtual machine is put in the source address field of the decapsulated data packet; and forwarding the decapsulated data packet by the network switch.

44. The packet forwarding method as claimed in claim 39, wherein a length of the most significant bytes is the same to a length of the least significant bytes.

45. The packet forwarding method as claimed in claim 39, further comprising:

migrating one of the virtual machines from one of the physical machines to another one of the physical machines; and setting the transmission mode of each of the source-destination pairs corresponding to the one of the virtual machines as the indirect route mode.

46. A packet forwarding method, for forwarding data packets among a plurality of machines according to an Ethernet protocol, wherein the machines comprise a plurality of physical machines and a plurality of virtual machines, each of the virtual machines is belonged to one of the physical machines, and the physical machines are connected through a plurality of network switches, the package forwarding method comprising:

respectively configuring corresponding logical media access control addresses for the physical machines, the virtual machines and the network switches, wherein each of the logical media access control addresses comprises most significant bytes and least significant bytes, and the most significant bytes are set as 0;

establishing a plurality of source-destination pairs according to the machines;

estimating a priority sequence of the source-destination pairs;

assigning a transmission mode corresponding to each of the source-destination pairs to be a direct route mode or an indirect route mode according to the priority sequence and a plurality of forwarding table entries of each of the network switches; and when the indirect route mode is applied to send a data packet from a first virtual machine in the virtual machines to a second virtual machine in the virtual machines, identifying a second physical machine corresponding to the second virtual machine, obtaining the logical media access control address of the second physical machine corresponding to the second virtual machine from a management server, encapsulating the data packet, and sending the encapsulated data packet, wherein the second physical machine corresponding to the second virtual machine is one of the physical machines, wherein the encapsulated data packet has a destination address field and a source address field, the logical media access control address of the second physical machine corresponding to the second virtual machine is put in the destination address field of the encapsulated data packet, and the least significant bytes of the logical media access control address of the first virtual machine and the least significant bytes of the logical media access control address of the second virtual machine are put in the source address field of the encapsulated data packet, wherein a length of the least significant bytes is half of a length of the source address field, the least significant bytes of the logical media access control address of the first virtual machine and the least significant bytes of the logical media access control address of the second virtual machine are put in a single source address field, and the logical media access control address of the second physical machine is put in a single destination address field, wherein the length of the encapsulated data packet is not extended and no new header is added into the encapsulated data packet, wherein the least significant bytes of the logical media access control address of the second virtual machine in the source address field are restored as a complete destination address and put in the destination address field of a decapsulated data packet, and the least significant bytes of the logical media access control address of the first virtual machine are restored as a complete source address and put in the source address field of the decapsulated data packet.

47. The packet forwarding method as claimed in claim 46, wherein the step of estimating the priority sequence of the source-destination pairs comprises:

periodically calculating a data packet traffic volume of each of the source-destination pairs; and sorting the source-destination pairs according to the data packet traffic volumes of the source-destination pairs to generate the priority sequence.

48. The packet forwarding method as claimed in claim 46, wherein the machines further comprise at least one storage server and at least one management server, wherein the step of estimating the priority sequence of the source-destination pairs comprises:

dividing the source-destination pairs into a physical machine-physical machine group, a virtual machine-management server group, a virtual machine-storage server group and a virtual machine-virtual machine group; and generating the priority sequence of the source-destination pairs sequentially according to the physical machine-physical machine group, the virtual machine-management server group, the virtual machine-storage server group and the virtual machine-virtual machine group.

49. The packet forwarding method as claimed in claim 47, wherein the step of assigning the transmission mode corresponding to each of the source-destination pairs to be the direct route mode or the indirect route mode according to the priority sequence and the forwarding table entries of each of the network switches comprises:

selecting one of the source-destination pairs according to the priority sequence;

determining whether the forwarding table entries are exhausted;

when the forwarding table entries are not exhausted, using one of the forwarding table entries to assign the transmission mode of the selected source-destination pair as the direct route mode; and when the forwarding table entries are exhausted, assigning the transmission mode of the selected source-destination pair as the indirect route mode.

50. The packet forwarding method as claimed in claim 46, further comprising:

when the second physical machine corresponding to the second virtual machine receives the encapsulated data packet, decapsulating the received data packet, wherein the logical media access control address of the second virtual machine is put in the destination address field of the decapsulated data packet, and the logical media access control address of the first virtual machine is put in the source address field of the decapsulated data packet; and forwarding the decapsulated data packet to the second virtual machine by the second physical machine.

51. The packet forwarding method as claimed in claim 46, wherein a length of the most significant bytes is the same to a length of the least significant bytes.

52. The packet forwarding method as claimed in claim 46, further comprising:

migrating one of the virtual machines from one of the physical machines to another one of the physical machines; and setting the transmission mode of each of the source-destination pairs corresponding to the one of the virtual machines as the indirect route mode.

\* \* \* \* \*